United States Patent

[11] 3,609,247

[72] Inventor William S. Halstead
New York, N.Y.

[21] Appl. No. 632,699
[22] Filed Apr. 21, 1967
[45] Patented Sept. 28, 1971
[73] Assignee Carrier Communication, Inc.
New York, N.Y.

[54] INDUCTIVE CARRIER COMMUNICATION SYSTEMS
3 Claims, 44 Drawing Figs.

[52] U.S. Cl. .......... 179/82
[51] Int. Cl. .......... H04b 5/00, H04b 5/02
[50] Field of Search .......... 179/82, 1 VE

[56] References Cited

UNITED STATES PATENTS

| | | | |
|---|---|---|---|
| 2,980,793 | 4/1961 | Daniel | 179/82 |
| 2,611,075 | 9/1952 | Marlowe | 179/82 |
| 3,383,595 | 5/1968 | Obata | 179/82 |
| 3,470,474 | 9/1969 | Rohrer | 179/82 |

*Primary Examiner*—Kathleen H. Claffy
*Assistant Examiner*—William A. Helvestine
*Attorney*—Kenyon & Kenyon Reilly Carr & Chapin

ABSTRACT: An integrated multiple-function communication system for highways, railroads and other applications, the system comprising a wideband coaxial trunk cable with associated amplifier/repeaters for long-distance point-to-point transmission of a plurality of carrier signals combined with inductive-signaling means including frequency converter/amplifiers each having an input physically coupled to the coaxial trunk cable and an output coupled to an inductive-signaling conductor, the latter disposed within the trunk-cable structure or electrically related thereto whereby a relatively uniform electromagnetic field of a desired strength is established along a highway or other service zone for inductive carrier communication with vehicles, roadside call boxes and other devices located in proximity to the cable which interconnects with a control or terminal point.

WILLIAM S. HALSTEAD
INVENTOR.

BY Kenyon & Kenyon
ATTORNEYS

PATENTED SEP 28 1971

3,609,247

SHEET 02 OF 14

WILLIAM S. HALSTEAD
INVENTOR.

BY Kenyon & Kenyon
ATTORNEYS

WILLIAM S. HALSTEAD
INVENTOR.

BY Kenyon & Kenyon
ATTORNEYS

WILLIAM S. HALSTEAD
INVENTOR.

BY Kenyon & Kenyon
ATTORNEYS

WILLIAM S. HALSTEAD
INVENTOR.

BY Kenyon & Kenyon
ATTORNEYS

WILLIAM S. HALSTEAD
INVENTOR.

BY Kenyon & Kenyon
ATTORNEYS

WILLIAM S. HALSTEAD
INVENTOR.

BY Kenyon & Kenyon
ATTORNEYS

WILLIAM S. HALSTEAD
INVENTOR.

BY Kenyon & Kenyon
ATTORNEYS

WILLIAM S. HALSTEAD
INVENTOR.

BY Kenyon & Kenyon
ATTORNEYS

WILLIAM S. HALSTEAD
INVENTOR.

BY Kenyon & Kenyon
ATTORNEYS

*WILLIAM S. HALSTEAD*
INVENTOR.

BY Kenyon & Kenyon
ATTORNEYS

WILLIAM S. HALSTEAD
INVENTOR.

BY Kenyon & Kenyon
ATTORNEYS

WILLIAM S. HALSTEAD
INVENTOR.

BY Kenyon & Kenyon
ATTORNEYS

WILLIAM S. HALSTEAD
INVENTOR.

BY Kenyon & Kenyon
ATTORNEYS

INDUCTIVE CARRIER COMMUNICATION SYSTEMS

FIELD OF THE INVENTION

This invention relates to improvements in communication systems of inductive carrier type and, more particularly, this invention relates to communication systems of inductive carrier type in which a plurality of radio frequency carrier signals having various modes of modulation to accomplish a number of discrete functions are impressed on a cable of special design or other suitable conducting media extending in proximity to highways, railroad right of ways or other delineated areas in which one-way or two-way communication services are to be established.

BACKGROUND OF THE INVENTION

This invention has particular applicability in the field of highway or other roadway communications and in providing a restricted range broadcast service in small communities where conventional broadcast transmitters cannot be used because of lack of availability of AM broadcast channels in the standard broadcast band, now almost fully occupied in many sections of the United States.

Many systems of inductive carrier type, including those of the applicant, have been employed in the past for highway, railroad and other uses. However, these have presented serious technical problems when operated at relatively high carrier frequencies, such as those in the AM broadcast band. Radiation of electrical wave energy, which is an inherent characteristic of inductive carrier systems when operated at radio frequencies, often extends over distances far in excess of the permissible limit specified by the Federal Communications Commission for low-power radio devices of restricted range type. While it has been possible, by careful adjustment of radiofrequency (RF) carrier level to comply with the Commission's rules in certain localized applications, such as the highway radio system installed by the applicant on the George Washington Bridge in 1940, experience in most cases has demonstrated that it is extremely difficult, and in some instances impossible, to comply with the FCC rules over any substantial period when unattended transmitters are employed and, at the same time, to maintain a sufficiently strong induction field at broadcast frequencies to enable good reception in radio-equipped cars traveling over lengths of highway served by the system.

Experience with roadside conductors of various types, including single and dual conductor transmission lines has indicated that the strength of the induction field about these conductors is subject to substantial variation along their length. Near the transmitter source, for example, the field strength may be too high to comply with FCC rules at broadcast frequencies if a useful, noise-free signal is to be provided in cars on all lanes of the highway served by the system. In addition, if the cable is ground-laid or is in the surface of the right-of-way, as required on turnpikes and thruways where above-surface installations are not desired, variations in the inductive-signaling field due to changes in soil conductivity under different weather conditions and other irregularities in environmental conditions have been found to present difficulties over a substantial period of time in maintaining a reasonably constant field strength and restriction of radiation within limits set by the FCC.

Moreover, experience with conventional forms of cables, or wires, when employed along the roadside as RF signal conductors for the purpose of producing an induction-signaling field as a means of impressing carrier signal energy on the vertical whip antenna system of radio broadcast receivers carried by motor vehicles indicates that the coupling loss between the vertically disposed vehicle antenna and the horizontally polarized signals from the roadside cable system, whether in the form of a single longitudinally extending transmission line or in horizontal loop configuration, encompassing the roadway area, is unnecessarily high. This results in requirement of substantially more RF power in the roadside cable system than would be required if a vertically polarized or convolutive field, having vertical and horizontal polarization characteristics, were provided. The present system incorporates as an important element what are believed to be unusual and novel means for developing such a convolutive field to produce a signal of maximum strength in receiving systems of motor vehicles carrying conventional antennas of vertical ship type. This, in turn assists in meeting the requirements of the FCC with respect to restricted range radio devices.

An additional, and serious problem, is presented in applying inductive carrier methods at AM broadcast frequencies in the vicinity of large metropolitan areas, such as New York City and environs, where the AM broadcast band is fully occupied. This is of primary importance insofar as applications of inductive carrier methods in the field of highway communications is concerned since one of the most valuable functions in these urban areas is in providing information to drivers on such matters as traffic congestion, hazardous or unusual road conditions on the route ahead, routing instructions and other intelligence that will assist motorists on major, and often overcrowded, traffic arteries in the vicinity of large cities.

To illustrate the latter problem and to indicate the nature of the difficulty that is involved, it is pointed out that in the New York City area the lower frequencies in the AM broadcast band, where inductive carrier systems at broadcast frequencies may most effectively be applied in highway communication services, are fully occupied. For example, 540 kc., a preferred frequency for operation of inductive carrier systems in areas where this channel is available, is used by a suburban station, employing a 250-watt transmitter in daytime service. The next channel that can be employed for conventional broadcast service in the New York City area under the Commission's allocation plan is 570 kc., occupied by a 50-kilowatt metropolitan class station. Signals from both stations can be heard throughout the area. If conventional AM broadcast equipment were to be used for the highway service on the frequency of 555 kc., midway between the 540 kc. and 570 kc. channels assigned to local stations, mutual interference would be produced, assuming that as in standard broadcast operation modulation sidebands would extend to 10 kc. above and below the carrier frequency, since sideband areas would overlap. An additional communications problem is presented on parkways, turnpikes and new interstate highways with respect to hazards presented by disabled cars and inability of drivers to quickly summon aid, since conventional wayside telephones often are widely spaced and not locally available. Also, many turnpikes have no wayside telephone circuits to permit installation of telephones at reasonably spaced intervals, within easy walking distance from disabled cars.

Practicable solutions to the problems as set forth above are incorporated in the present invention. These solutions also produce a substantial improvement in the quality and intelligibility of received signals as reproduced by typical AM broadcast receivers now in general use in the majority of motor vehicles; relative uniformity and stability of operation of unattended roadside transmitters is provided; minimization of radiation of wave energy to areas remote from the roadway is attained while maximum intensity and uniformity of the induction field may be maintained over long distances on a common carrier frequency; unwanted transfer of signal energy to roadside electric power or telephone lines, with the interference potential that such coupling may produce, is minimized; heterodyne beats between adjacent roadside transmitting zones is avoided; and in preferred embodiments of the invention relaying of signals to vehicles traveling throughout the length of a highway is accomplished without demodulation and remodulation of carrier signals, thus greatly simplifying equipment, minimizing distortion and eliminating overmodulation difficulties that otherwise would exist at remote, unattended highway transmitting points along the roadway system. By use of self-powered carrier telephones that may be located at half-mile intervals along the roadside cable and coupled thereto, together with use of multiple carriers, a distress-calling system of value to motorists is provided. These and other improvements presented by the system of the invention are described in subsequent pages.

OBJECTS OF THE INVENTION

It is, therefore, an objective of the present invention to provide an inductive carrier communication system of a type that will provide a received signal of maximum strength and uniformity that is applicable to highway, railroad and other restricted range communication services where it is desired to effect communication without physical contact with conductors extending throughout the length of the system from a terminal point or between terminal points where signals originate.

It is an additional object of the present invention to provide an inductive carrier communication system in which maximum inductive-signaling field is developed by the cable system of the invention with minimum radiation of electrical wave energy at points removed from the area in which localized inductive-carried communications is to be established.

It is a further object of the present invention to provide an inductive carrier communication system that can be adapted readily to highway, railroad, airport and other communication services by use of new and improved cable structures that incorporate coaxial trunk circuits and inductive-signaling conductors within a common protective jacket, said cable structure being such that it may be buried in roadway surfaces of any type or configuration and is relatively insensitive to the conduction characteristics of the medium in which or on which the cable may be installed.

It is another object of the present invention to provide a new and unique cable structure for roadway communication services of inductive carrier type that will provide a signal of maximum intensity in radio receiving equipment carried by vehicles employing conventional forms of vertical "whip" antennas by providing an induction field having a vertical polarization characteristic as contrasted with the horizontal polarization produced by conventional transmission lines extending in a horizontal direction along roadways or horizontal loops encompassing the roadway area that have been disclosed or employed in the prior act.

It is an additional object of the present invention to provide an inductive carrier communication system that will provide a useful signal of maximum strength and uniformity along the length of the zone or zones served by the system with minimum inductive transfer of signal energy to power or telephone lines that may extend in proximity to and along the zone or zones within which inductive communication is desired.

It is a further object of the present invention to provide a new and improved coaxial cable structure incorporating trunk coaxial feed circuits and inductive signaling conductors that may be installed readily above the ground, on the surface or underground with minimum attenuation of the induction field with respect to the location of the cable or the characteristics of the medium on which or within which the cable may be located.

It is an additional object of the present invention to provide an inductive carrier communication system in which modulation methods are such that relay of signals over long distances, as along a highway or railroad, may be accomplished on a common carrier frequency, with relay repeaters or translators of such design that demodulation and remodulation processes are not required at repeater or relay points where trunk carrier signals of relatively low frequency are converted to an RF carrier at a frequency common to the entire system and applied at intervals along a trunk circuit of coaxial type to supplementary inductive-signaling conductors, each of which provides a useful inductive communication zone, each zone serving an individual length of highway, railroad or other facility and in contiguous sequential relationship to adjacent zones.

It is a further object of the present invention to provide an inductive carrier system that will serve a multiplicity of functions, including control and monitoring of individual roadside transmitter units in order to check on operation and quality of signals at a remote central control point; remote control of wayside signs and signals, with monitor checkbacks at the central control points on a fail-safe basis; data transmission by multiple subcarriers on the trunk portion of the cable provided by the system; two-way point-to-point and mobile communication services via the cable system; distress calling, location-identifying and communication facilities for use by occupants of disabled vehicles and other communication and signaling facilities useful on highways and on railroads.

It is an additional object of the present invention to provide a coaxial trunk and inductive-signaling cable structure and associated supporting and/or protective means enabling the cable to be installed in the beds of new highway or railroad construction or on existing roadways in such manner to withstand without damage the pressures or temperatures that are involved in construction and maintenance procedures.

It is another object of the resent invention to provide a coaxial cable system and supporting and/or protective structure therefore that will enable the installation of inductive-signaling and intercity or other multichannel communication facilities of subsurface type to be installed in or along highway or railroad rights-of-way in such manner that cable may readily be installed and thereafter be protected against damage.

DESCRIPTION OF THE DRAWINGS

Other objects of the present invention will be readily apparent from the following description and drawings in which.

DETAILED DESCRIPTION OF THE EMBODIMENT

DESCRIPTION OF FIG. 1

Figures 1, 2, 3, 4:
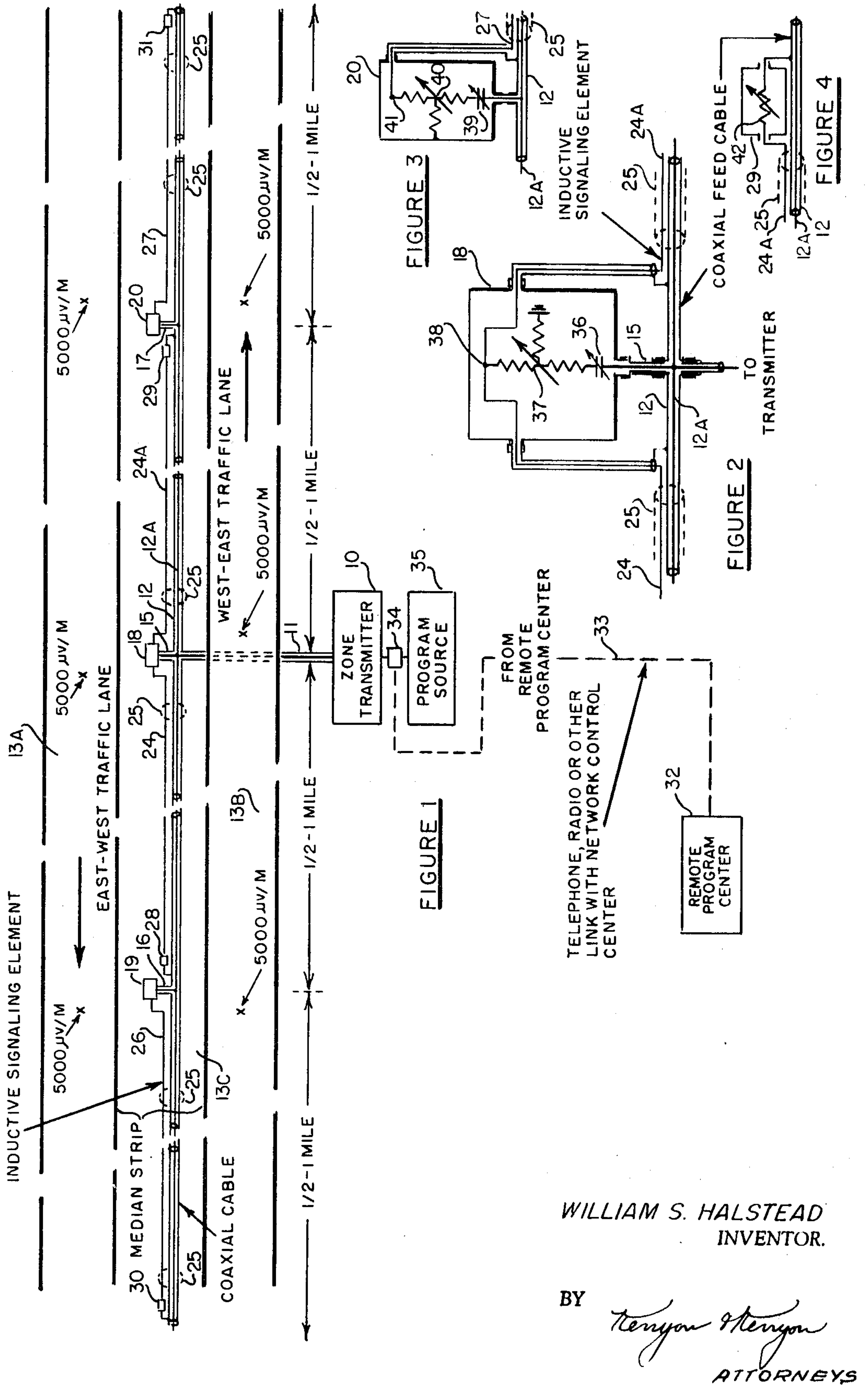
FIG. 1 is a diagrammatic view of one embodiment of the inductive carrier communication system of the present invention.
FIG. 2 is a schematic view of one form of signal attenuating and line-coupling means that may be used in the inductive carrier communication system of the present invention.
FIG. 3 is a schematic view of another form of a signal attenuating and line-coupling means that may be used in the inductive carrier communication system of the present invention.
FIG. 4 is a schematic view of an inductive-signaling line termination unit that may be used in the inductive carrier communication system of the present invention.

An illustrative application of one form of the invention is shown in FIG. 1 in which a carrier transmitter 10, in this case operating at a broadcast frequency of 540 kc., is connected by coaxial cable 11 to a roadside coaxial cable 12–12A extending parallel to and intermediate traffic lanes 13A and 13B carrying vehicle traffic in opposite directions. In coaxial cable 12–12A, the center conductor is denoted by 12 and the ground sheath conductor is denoted by 12A. At intervals along coaxial cable 12–12A, preferably installed below the surface of the roadway or the adjoining area thereof, a controlled amount of radiofrequency (RF) carrier energy is applied by means of coaxial branch connections 15, 16 and 17 and adjustable coupling and attenuating means 18, 19 and 20 to longitudinally extending conductors 24, 24A, 26 and 27, respectively, which serve as the inductive-signaling elements of the system.

As will be described hereinafter, these inductive-signaling conductors may be incorporated as an inherent part of the roadside coaxial cable 12–12A and contained within the same cable structure or jacket 25, or the inductive-signaling elements may otherwise be associated with coaxial cable 12–12A in fixed circuit and spacial relationship. The ends of inductive signaling elements 24, 24A, 26 and 27 are connected through termination units 28, 29, 30 and 31 respectively to the common metallic ground circuit provided by the sheath 12 of coaxial cable 12–12A. Inasmuch as the inductive-signaling elements 24, 24A, 26 and 27 have a fixed and uniform impedance relationship with respect to the common ground sheath 12 of the coaxial cable, the inductive transmission line formed by each of these elements and ground sheath 12 can be terminated readily in such manner as to match the characteristic impedance of each line section at the broadcast carrier frequency employed throughout the length of roadway system.

As illustrated in FIG. 1, inductive signaling elements 24, 24A, 26 and 27 are disposed along the coaxial cable 12–12A in contiguously sequential manner to provide a continuous and substantially uniform induction field at a common carrier frequency in order that signals as received in radio-equipped vehicles traveling throughout the length of the roadway served by the system will be uninterrupted and of substantially constant strength as the vehicles pass through the individual signaling zones created by the inductive fields from the conductors 24, 24A, 26 and 27. A vehicle traveling from west to east on traffic lane 13B would, for example, hear the transmitted signals of 540 kc. first from inductive-signaling conductor 26, then from conductors 24, 24A and 27 in sequence without material change in received signal level or break in reception. Objectional change in strength of the induction field extending throughout the length of roadway shown in the illustration is prevented by minimizing any reflection from the terminal units 30, 28, 29 and 31. Such reflection otherwise would result in standing waves along the conductors 26, 24, 24A and 27, causing variations in the field and undesired radiation of wave energy over distances in excess of limits designated by the Federal Communications Commission for unlicensed low-power radio devices.

An important advantage of the arrangement as shown in FIG. 1 is that a substantial amount of carrier energy may be impressed on coaxial cable 12–12A in order to serve a relatively long stretch of roadway, but by means of the attenuators 19, 18 and 20 the amount of carrier energy applied to each individual inductive signaling conductor 26, 24, 24A and 27 may be regulated so that the inductive field surrounding each conductor may be controlled within desired limits. Thus, the system can be adjusted to provide a desired field strength, such as 5,000 microvolts per meter, at different points along the center of traffic lanes 13A and 13B without objectionable radiation of wave energy to points removed from the right-of-way.

The roadside transmitter 10 may be connected with a remote control or program center 32 by means of a telephone line 33 or any other suitable wire line or radio communication circuit. Alternatively, the transmitter 10 may be connected by any well-known type of switching means, 34 locally or remotely controlled, with a local program source 35 at the roadside location. The latter may be any well-known type of repeating magnetic tape reproducing and/or recording device on which messages addressed to motorists can be recorded and continuously repeated, a microphone, or any other suitable source of information or signals to be transmitted to receiving equipment carried by vehicles traveling along the traffic lanes served by the system.

DESCRIPTION OF FIG. 2

One arrangement of RF signal attenuating and line-coupling means is shown in FIG. 2 wherein RF carrier energy from the center conductor 12A of coaxial trunk cable 12–12A is applied through coaxial branch connection 15 and adjustable or fixed coupling capacitor 36 to adjustable attenuator 37, of any suitable well-known type, such as the resistive "T" network shown, which presents a substantially constant impedance at input and output terminals with variation of the attenuator. The output terminal 38 is connected with inductive signaling elements 24 and 24A, forming a part of wayside cable 25 comprising the coaxial trunk cable 12–12A and the inductive signaling elements held in fixed spacial and impedance relationships as will be more fully described hereinafter. It will be noted that by use of the "T" connection of the output terminal 38 with inductive signaling conductors 24 and 24A, signal energy may be carried in two directions along the roadway from line-coupling and attenuator unit 18, thus minimizing the number of coupling-attenuator units required along a given length of roadway. In addition, this arrangement produces two induction fields of equal strength and opposite direction at any given instant, hence tending to cancel signal voltage that may be induced on wayside electric power or telephone lines extending adjacent conductors 24 and 24A thereby extending the range of the signals beyond the desired limits of the right-of-way and presenting a potential source of interference with other systems or services at points remote from the roadway. The coupling capacitor 36 preferably has a small capacity value in order to minimize loading and voltage-attenuating effect on the trunk circuit presented by coaxial cable 12–12A.

DESCRIPTION OF FIG. 3

Referring now to FIG. 3, there is shown an RF line-coupling and attenuator unit such as 20, FIG. 1, which provides signal energy at its output terminal 41 in only one direction. As shown signal energy from the center conductor 12A of coaxial cable 12–12A is applied through an adjustable or fixed coupling capacitor 39 to adjustable attenuator 40, of resistive type. Output terminal 41 of attenuator 40 is connected to inductive signaling element 27 which may, as shown, be contained within the same cable structure 25 as the coaxial trunk cable 12–12A.

DESCRIPTION OF FIG. 4

Referring now to FIG. 4, there is shown in greater detail the inductive-signaling line termination unit such as 29 of FIG. 1. As shown, termination unit 29, to which conductor 24A is connected, comprises an adjustable or fixed resistor 42, preferably of noninductive type 43 to match the characteristic impedance of the RF transmission line at its operating frequency (this line comprising inductive-signaling conductor 24A and ground sheath 12 of coaxial cable 12–12A) thus preventing reflection of signal energy back along the line with consequent possible formation of standing waves and attendant radiation.

DESCRIPTION OF FIG. 5

Figures 5, 6, 7, 8, 9:
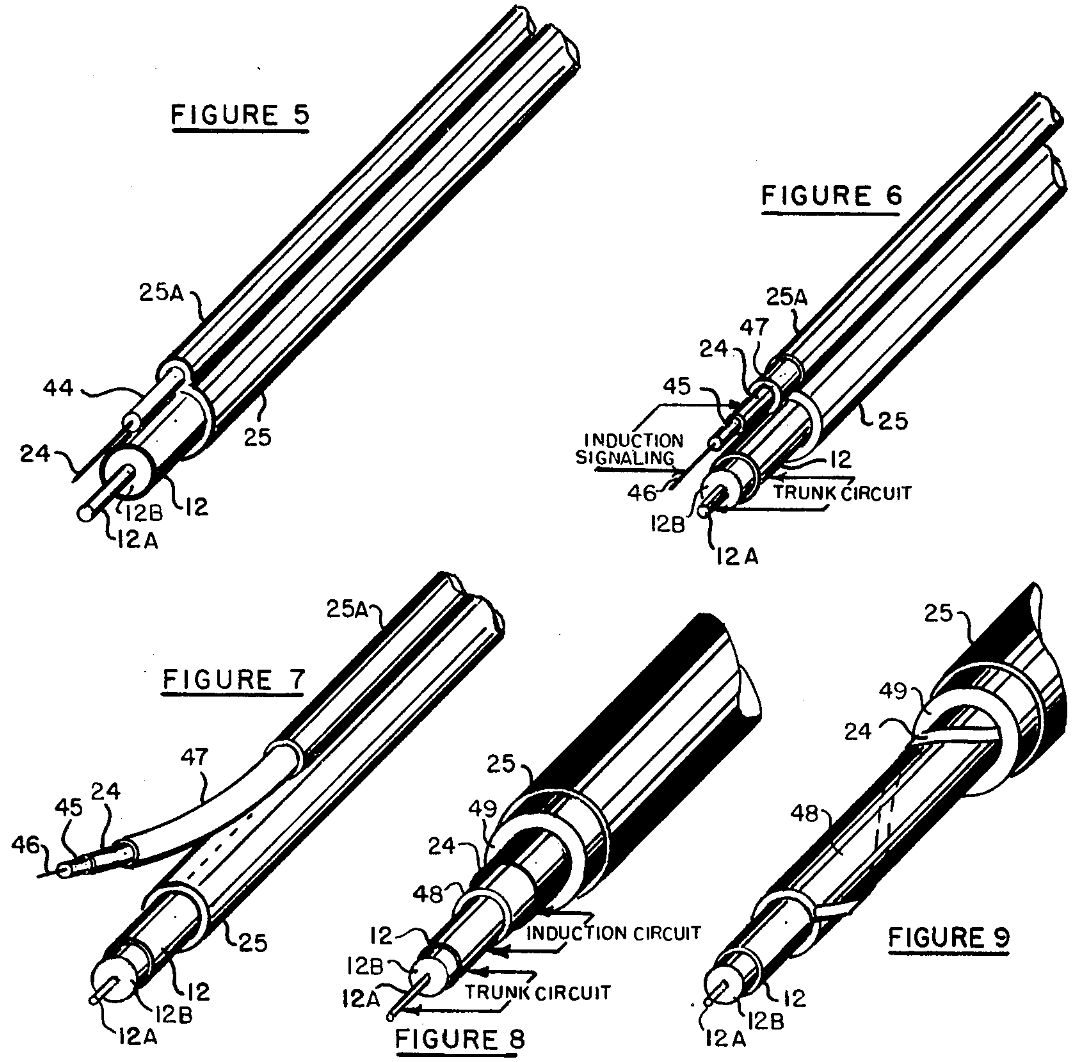
FIG. 5 is a perspective view of one embodiment of the cable structure of the present invention.
FIG. 6 is a perspective view of another embodiment of the cable structure of the present invention.
FIG. 7 is a perspective view of yet another embodiment of the cable structure of the present invention.
FIG. 8 is a perspective view of still another embodiment of the cable structure of the present invention.
FIG. 9 is a perspective view of a further embodiment of the cable structure of the present invention.

Referring to FIGS. 5 to 9, there are shown alternative embodiments of a new and improved cable structure which may be employed in the inductive carrier communication system of the present invention. The embodiment of the cable, as shown in FIG. 5, comprises a center conductor 12A and coaxial sheath 12 separated by dielectric sleeve 12B. This coaxial portion of the cable is employed for trunk circuit use in transmitting carrier or other signals for long distances along the roadway served by the system. An inductive-signaling conductor 24, fabricated of copper, aluminum or other suitable conductive material in solid or stranded form is supported within dielectric sleeve 44 at a fixed distance from coaxial ground sheath 12 by means of a common protective insulating jacket 25–25A. The dielectric sleeve 44 is fabricated of polyethylene or other suitable insulating material possessing good dielectric properties at the radio frequency or frequencies employed in the system. Jacket 25–25A may be of any suitable and commonly used insulating material such as vinyl plastic. As the inductive-signaling conductor 24 is held at a fixed impedance relationship as a part of the transmission line in which sheath 12 is the ground conductor and the transmission line has a given impedance value, a combined coaxial trunk relay and inductive-signaling cable of this type may readily be installed and provided with proper terminations to minimize radiation. At the same time, such cable structure minimizes difficulties that would be presented in supplying RF energy from the center conductor 12 of coaxial cable 12–12A to conductor 40 at different points along the cable.

DESCRIPTION OF FIG. 6

A second embodiment of a combined coaxial trunk and inductive-signaling cable structure is shown in FIG. 6 wherein center conductor 12A and coaxial sheath 12 are similar to those shown in FIG. 5. However, in this cable structure the inductive-signaling conductor 24 is in the form of a coaxial copper sheath in order to present maximum skin surface and thereby minimize losses in the conductor at broadcast frequencies. Within sheath 24 are dielectric sleeve, 45, of polyethylene or other suitable insulating material, and center conductor 46 which is held at ground potential. (The same reference numeral 24 is used throughout this application to identify the inductive signaling conductor; the same reference numerals 12–12A also are utilized throughout the specification to denote the coaxial trunk cable employed for trunk relay and to supply RF energy to the inductive signaling conductors). Both the inductive signaling line 24–46 and the coaxial cable 12–12A are held within a common insulating jacket 25–25A, inductive-signaling element 24 being supported within jacket 25A by means of dielectric sleeve 45, of polyethylene or other suitable RF dielectric material.

DESCRIPTION OF FIG. 7

A modification of the inductive-signaling cable shown in FIG. 6 is illustrated in FIG. 7 in which center conductor 12A and sheath conductor 12 of coaxial cable 12–12A are enclosed in insulating protective jacket 25. The inductive-signaling element, sheath conductor 24, dielectric sleeves 45 and 47, and center ground conductor 46 are held in an insulating protective jacket 25A which is removably attached to jacket 25 to facilitate circuit connections. In effect, however, the arrangement forms a single cable which may be laid in the ground, in roadway surfaces or otherwise installed with minimum of difficulty.

DESCRIPTION OF FIG. 8

An additional embodiment of a combined inductive signaling and coaxial trunk cable is shown in FIG. 8. As shown, coaxial elements 12 and 12A are similar to those illustrated and described heretofore. As in the case of FIG. 7, the inductive signaling element 24. as in FIG. 7, is in the form of a conducting sheath which presents maximum skin surface to minimize losses at radio frequencies in the AM broadcast band. A suitable dielectric sleeve 48, such as polyethylene, is used between induction-signaling conductor 24 and coaxial ground sheath 12, both in coaxial relationship. A dielectric sleeve 49 having a wall thickness substantially greater than that of inner sleeve 48 is employed to minimize losses when the cable is buried in earth or in physical contact with conducting materials such as metal surfaces of bridges or tunnels, railings on which the cable is supported and the like. A protective insulating jacket 25, fabricated of suitable material such as vinyl plastic, is employed as shown. The inductive transmission line in this cable structure is formed by outer sheath 24 and inner ground sheath 12, establishing the impedance of the circuit.

DESCRIPTION OF FIG. 9

A further embodiment of a combined inductive-signaling and coaxial trunk cable is shown in FIG. 9. Center conductor 12A and coaxial ground sheath 12 are held in RF dielectric sleeve 48 about which is positioned in convolutive manner a conducting strip 24 of copper, aluminum or other suitable conductor which forms the inductive signaling element of the cable. As shown in the illustration, the spiral conducting strip 24 is held within a relatively thick-walled dielectric sleeve 49. A protective insulating jacket 25, of vinyl plastic or other suitable material surrounds dielectric sleeve 49. The inductive signaling line in this case is formed by conducting strip 24 and coaxial ground sheath 12, with fixed impedance presented by the line.

DESCRIPTION OF FIG. 10

Figure 10:
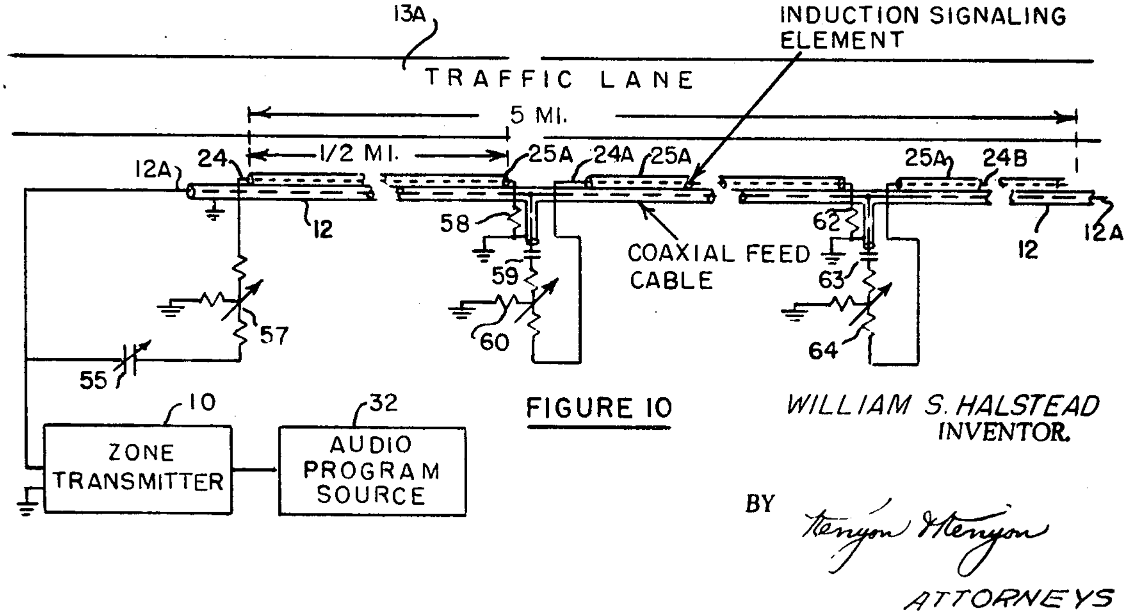
FIG. 10 is a schematic view of an inductive carrier communication system of the present invention utilizing the cable structure shown in FIG. 5.

Referring now to FIG. 10 there is shown in schematic form the use of an inductive signaling cable of the type shown in FIG. 5. An RF carrier modulated by audio signals from program source 32 is supplied by transmitter 10 at a designated frequency in the broadcast band to the roadside coaxial cable formed by inner conductor 12A and ground sheath 12, extending along traffic lane 13A. A relatively small amount of RF carrier energy is applied from coaxial center conductor 12A through coupling capacitor 55 and adjustable attenuator 57 in inductive signaling conductor 24 supported within jacket 25A and positioned in fixed relationship with respect to ground sheath 12 as illustrated in FIG. 5. The inductive transmission line formed by conductor 24 and ground sheath 12 is terminated by resistor 58, assuming inductive or capacitive reactances have been balanced out. At a given distance along the cable, such as ½ mile, coupling capacitor 59 and RF attenuator 60 enable a desired amount of RF signal voltage from center conductor 12 of coaxial cable 12–12A to be applied to inductive signaling conductor 24A, serving its individual section of roadway, and extending to termination resistor 62, connected between conductor 24A and ground sheath 12. In similar manner, RF signal energy from center conductor 12A of coaxial cable 12–12A is applied through coupling capacitor 63 and adjustable attenuator 64 to inductive signaling element 24B. By proper adjustment of attenuators, 57, 60 and 64, the induction field extending along the cable system may be established in such manner that a substantially uniform and strong signal is received in radio-equipped cars traveling along the traffic lane 13A throughout the length of that portion of the system shown in the illustration.

DESCRIPTION OF FIG. 11

Figure 11:
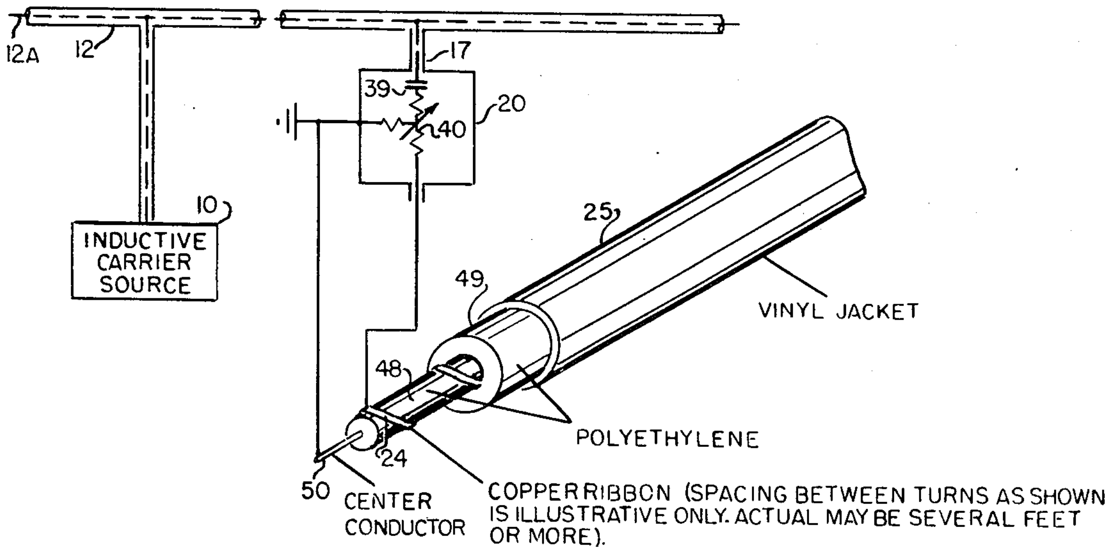
FIG. 11 is a partially perspective, partially schematic view of an inductive carrier communication system of the present invention utilizing an induction signaling cable separate from the trunk coaxial cable.

FIG. 11 illustrates one preferred form of induction signaling cable which may be separated from the coaxial trunk cable 12–12A and at the same time present a fixed transmissionlike impedance so as to facilitate proper termination to avoid radiation. The induction signaling cable is of such a structure as to minimize losses at AM broadcast frequencies when the cable is installed below the surface of roadways as required on throughways or interstate highways where overhead or above-surface cables are not permitted. In the illustrative arrangement shown in FIG. 11, RF signal energy at a designated carrier frequency in the AM broadcast band is applied from carrier source 10 through coaxial trunk cable 12–12A and coaxial branch connection 17 to coupling capacitor 39 and adjustable attenuator 40, of coupling and attenuator unit 20, to the inductive transmission line formed by conductor 24. formed in convolutive manner as shown, disposed in coaxial relationship to center conductor 50, held at ground potential. Conductor 24 is separated from center conductor 50 by a dielectric sleeve 48, formed of polyethylene or other suitable insulating material. To minimize effect of the medium in which or on which the cable is laid, a relatively thick-walled dielectric sleeve 49, such as polyethylene, surrounds the inductive signaling conductor 24, while an insulating protective jacket 25, fabricated of vinyl plastic or other suitable material, comprises the outer shell of the cable.

As indicated by the illustration, the wall thickness of the inner dielectric sleeve 48 is preferably substantially less than that of the outer dielectric sleeve 49. This arrangement permits the impedance of the inductive transmission line formed by spiral conductor 24 and center conductor 50 to be established primarily by the relationship between these two conductors, with minimum changes in line characteristics or losses because of variations in soil conductivity or other external factors. The inductive signaling cable shown in FIG. 11 may be employed on roadways where it may be desirable to utilize separate inductive-signaling cables fed by RF signal energy from a conventional coaxial cable, such as 12–12A, for trunk relay between terminal points.

DESCRIPTION OF FIG. 12

Figure 12:
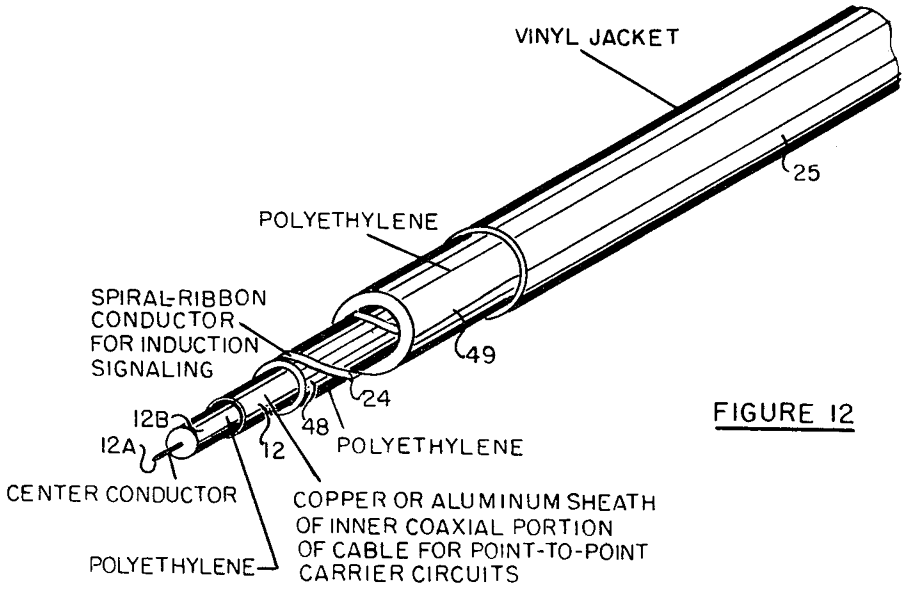
FIG. 12 is an enlarged perspective view of the embodiment of the cable structure of the present invention shown in FIG. 8.

FIG. 12 is an enlarged detail of a modified form of the combined coaxial trunk and inductive-signaling cable shown in FIG. 8 and illustrates the use of a spiral conductor strip 24 in lieu of the sleeve form of conductor 24 as shown in FIG. 8. This illustration also more clearly shows the relatively large wall thickness of the outer RF dielectric sleeve 49 employed in this illustrative form of cable as compared with the inner coaxial dielectric sleeve 48 that separates inductive signaling conductor 24 from inner coaxial ground sheath 12.

The illustration of FIG. 12 also emphasizes the difference between this inductive-signaling cable structure and that of conventional coaxial cables that have as basic purpose the confinement of all signal energy within the outer ground sheath in order to minimize transmission loss in carrying signal energy from one terminal to another. Conventional coaxial cables have no provision for establishing means whereby the signal energy carried by the cable may also be employed to establish an external inductive signaling field of substantially uniform and controlled nature for use in communicating with radio equipment carried by vehicles traveling parallel to the cable and at a substantial distance therefrom.

The cable shown in FIG. 12 also differs basically in design and function from double-shielded coaxial cables such as employed in community television systems to minimize radiation from the cable in order to prevent unauthorized viewers to intercept the programs for which subscribers pay. In these double-shielded cables, the both conducting sheaths are at ground potential and in direct electrical contact. There is no dielectric between the two ground sheaths, and except for a protective jacket there is no thick-walled dielectric such as polyethylene sleeve 49 disposed between the outer ground sheath and the jacket. All available types of coaxial cable having an outer insulating jacket employ the latter only for protective purposes, and the wall thickness of the jacket is determined by mechanical rather than radio frequency transmission loss factors.

DESCRIPTION OF FIG. 13

Figures 13, 14, 14A, 15, 15A, 16:
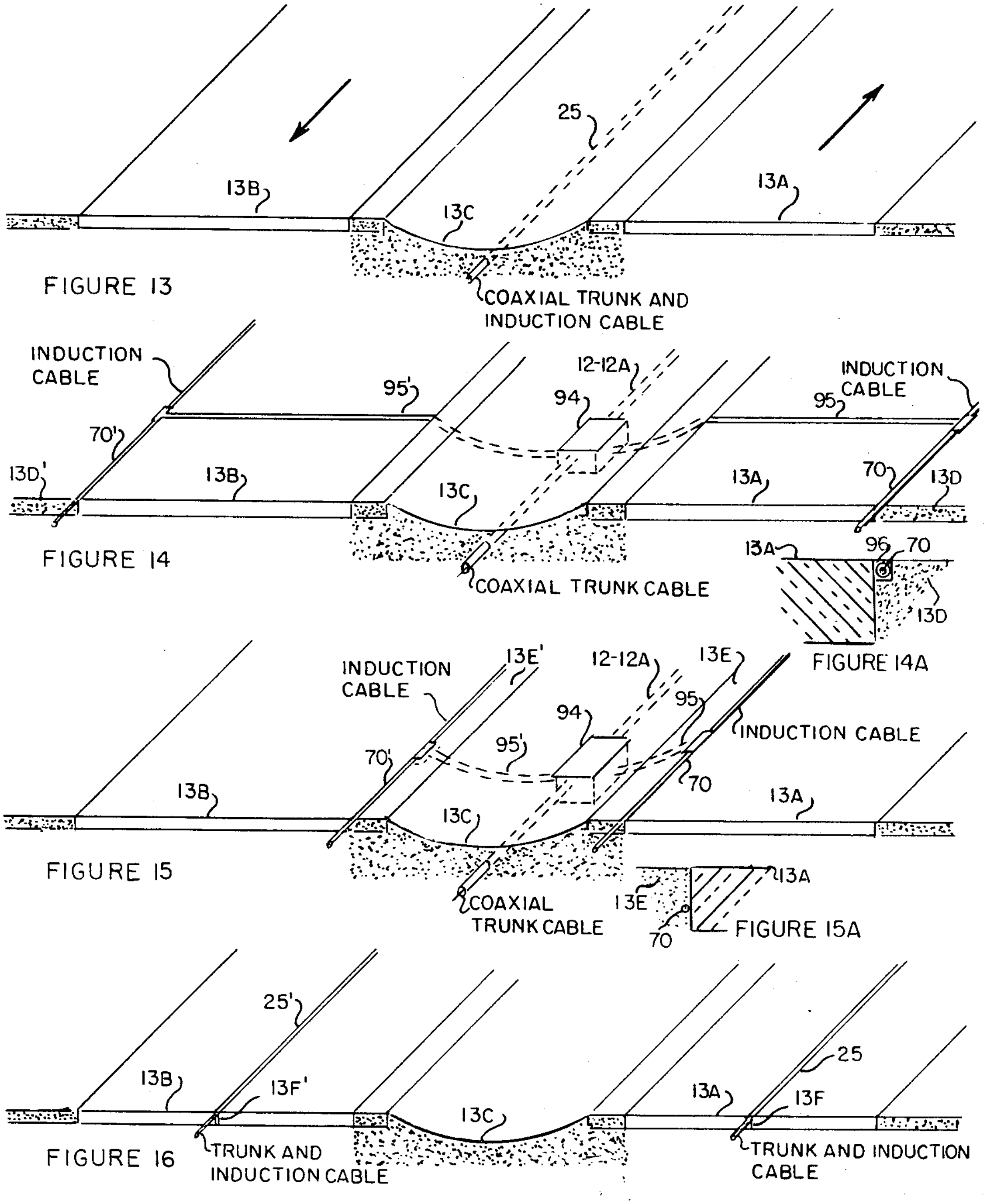
FIG. 13 is a partially sectional perspective view of a portion of a two-direction highway showing a combined coaxial trunk and inductive signaling cable buried in the dividing strip thereof.
FIG. 14 is a partially sectional perspective view of a portion of a two-direction highway showing the coaxial trunk cable buried in the dividing strip thereof and the inductive signaling conductors buried along the outer edges of the roadway surface.
FIG. 14A is a partially sectional view showing a preferred manner of burial of the inductive signaling conductors of FIG. 14.
FIG. 15 is a partially sectional, perspective view of a portion of a two-direction highway showing the coaxial trunk cable buried in the dividing strip thereof and the inductive signaling conductors buried along the inner edges of the roadway surface.
FIG. 15A is a partially section view showing a preferred manner of burial of the inductive signaling conductors of FIG. 15.
FIG. 16 is a partially sectional perspective view of a portion of a two-direction highway showing a combined coaxial trunk and inductive-signaling cable buried in the center of each of the roadways of the highway.

FIG. 13 illustrates the use of a combined coaxial trunk and inductive-signaling cable, with outer jacket 25, such as shown in FIGS. 5 through 9 and in FIG. 12, as installed in the dividing strip 13C of a two-direction highway having separated traffic lanes 13A and 13B. The induction field surrounding the cable thus is effective in reaching receiving equipment carried by vehicles traveling in either direction along the roadway.

DESCRIPTION OF FIG. 14

FIG. 14 illustrates the use of a conventional coaxial cable 12–12A, as installed in the center strip 13C of a roadway on which vehicles move in opposite directions on traffic lanes 13A and 13B, to supply carrier signal energy through junction box 94, the latter recessed in the ground and containing line-coupling capacitors such as 36 (FIG. 2) and RF attenuators such as 37 (FIG. 2) to coaxial branch cables 95 and 95' and inductive-signaling cables 70 and 70' serving traffic lanes 13A and 13B respectively. Cables 70 and 70' are inductive-signaling cables of the type shown in FIG. 11 and are designed in such manner, as hereinabove explained, to produce a maximum strength of induction field of substantially uniform nature along the cable which is terminated as previously explained to eliminate formation of standing waves on the line and attendant radiation beyond specified limits. The inductive signaling cables, in this illustrative arrangement, are installed below the surface of roadway 13A and 13B and along their outer edges between the roadway surface and shoulders 13D and 13D'.

DESCRIPTION OF FIG. 14A

FIG. 14A is a detail of FIG. 14 showing the use of a narrow channel, 96, between the roadway pavement 13A and shoulder 13D in which the inductive-signaling cable 70 is recessed. Channel 96 may be filled with any suitable protective material such as epoxy or cold-flow rubber-sealing compound which will adhere to the outer edge of the roadway and cause the cable to be held securely in position, as well as protect if from damage from passing vehicles, road maintenance machinery and effects of weather or sunlight.

DESCRIPTION OF FIG. 15

FIG. 15 illustrates an arrangement in which a conventional coaxial cable 12–12A and junction box 94 are located in protected position below the surface of center strip 13C. Junction box 94 contains line-coupling and adjustable RF attenuators as described in foregoing paragraphs relating to FIG. 14 and by means of branch coaxial cables 95 and 95' applies a controlled amount of RF carrier energy from the coaxial cable 12–12A to inductive-signaling cables 70 and 70', which may be similar to the structure shown in FIG. 11. In this instance, the inductive signaling cables are installed below the roadway surface along the inner edges of pavements 13A and 13B, between the roadway and inner shoulders 13E and 13E'. This is shown in detail in FIG. 15A wherein the inductive signaling cable 70 is buried in the shoulder 13E at a point in proximity to pavement 13A to minimize effects of weather and to provide protection from passing vehicles and road maintenance machinery.

DESCRIPTION OF FIG. 16

Figure 16A:
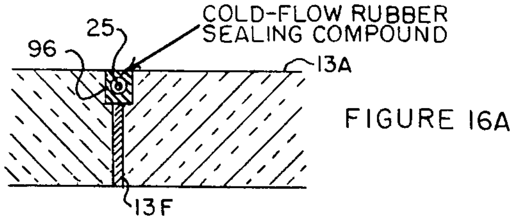
FIG. 16A is a partially sectional view showing a preferred manner of burial of the cable of FIG. 16.

FIG. 16 illustrates an arrangement in which the combined coaxial trunk and inductive-signaling cables comprised within jackets 25 and 25', as shown in FIGS. 5 through 9 and in FIG. 12, are installed in channels 13F and 13F' cut or formed in the centerline of each roadway 13A and 13B carrying traffic in opposite directions and separated by division strip 13C. A detail of a cross section of one of the roadways at the point where the cable is installed is shown in FIG. 16A wherein 13F represents a longitudinally extending expansion joint normally used in many concrete pavements and 96 represents a channel cut or formed in the upper surface of the roadway 13A to permit installation of the cable 25 below the surface. After or during installation of the cable, the channel 96 is filled with epoxy or cold-flow sealing compound of suitable type to provide mechanical protection from vehicles, maintenance machinery and effects of weather and sunlight.

DESCRIPTION OF FIGS. 17 AND 17A

Figure 17:
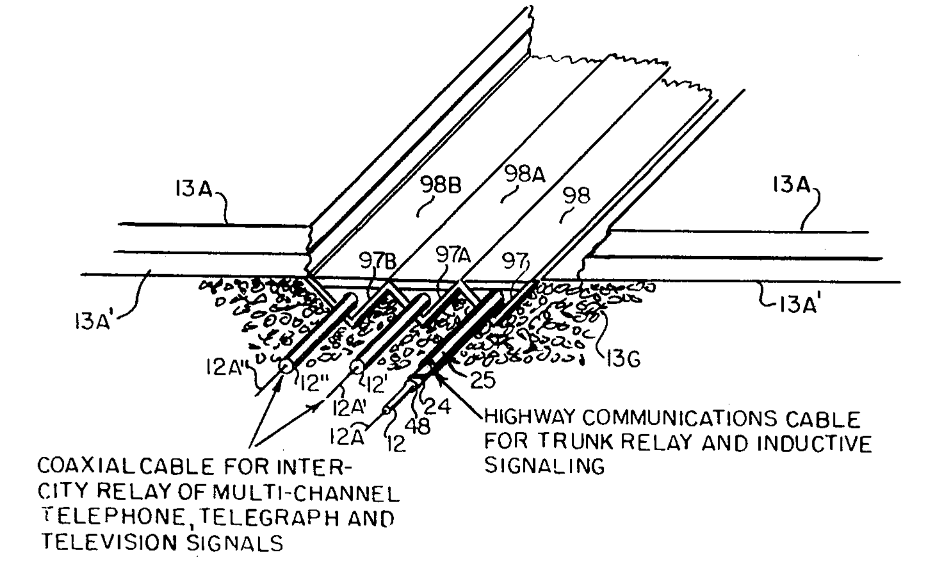
FIG. 17 is a partially sectional perspective view of a preferred form of structure for protecting buried cables used in the inductive carrier communication system of the present invention.
Figure 17A:
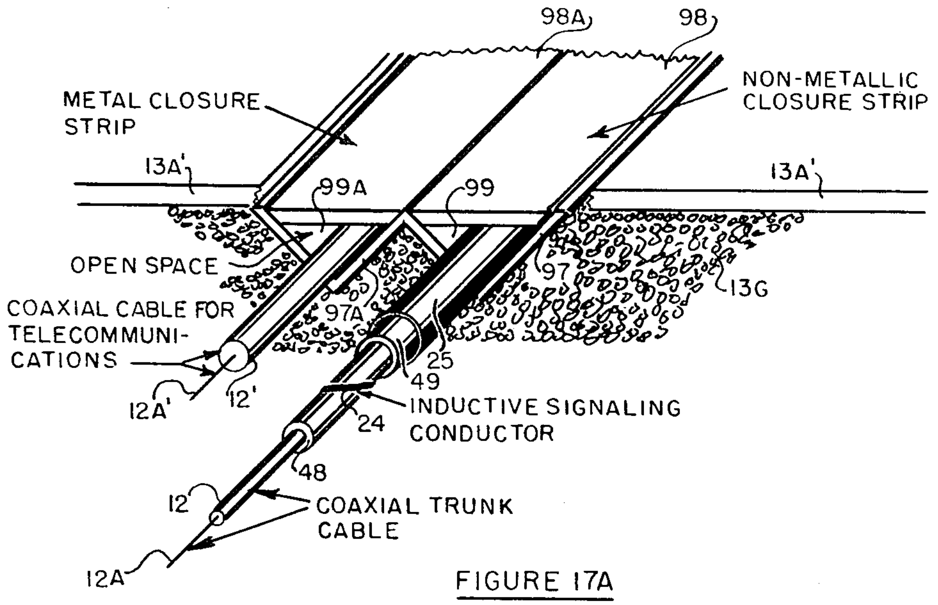
FIG. 17A is an enlarged partially sectional perspective view of the structure of FIG. 17.

FIGS. 17 and 17A show a presently preferred structural arrangement by means of which the coaxial trunk and inductive-signaling cable within jacket 25, having a structure as shown in FIG. 12, together with additional coaxial cables of conventional types, 12'—12A' and 12''—12A'', may, if desired, be positioned in new highways beneath the roadway surface within a partitioned metallic structure. This structure comprises a plurality of contiguous "V"-shaped members 97, 97A and 97B with horizontal closure members 98, 98A and 98B, the whole forming a unitary structure of sufficient mechanical strength to protect the cables from damage when the structure is positioned in the bed of a roadway during construction between the foundation of crushed rock 13G and layers of asphalt 13A' and 13A or other surfacing material such as concrete. The open construction of the "V" members before closure strips 98, 98A and 98B are installed permits cables to be laid easily and quickly.

Figures 18, 19, 19A:
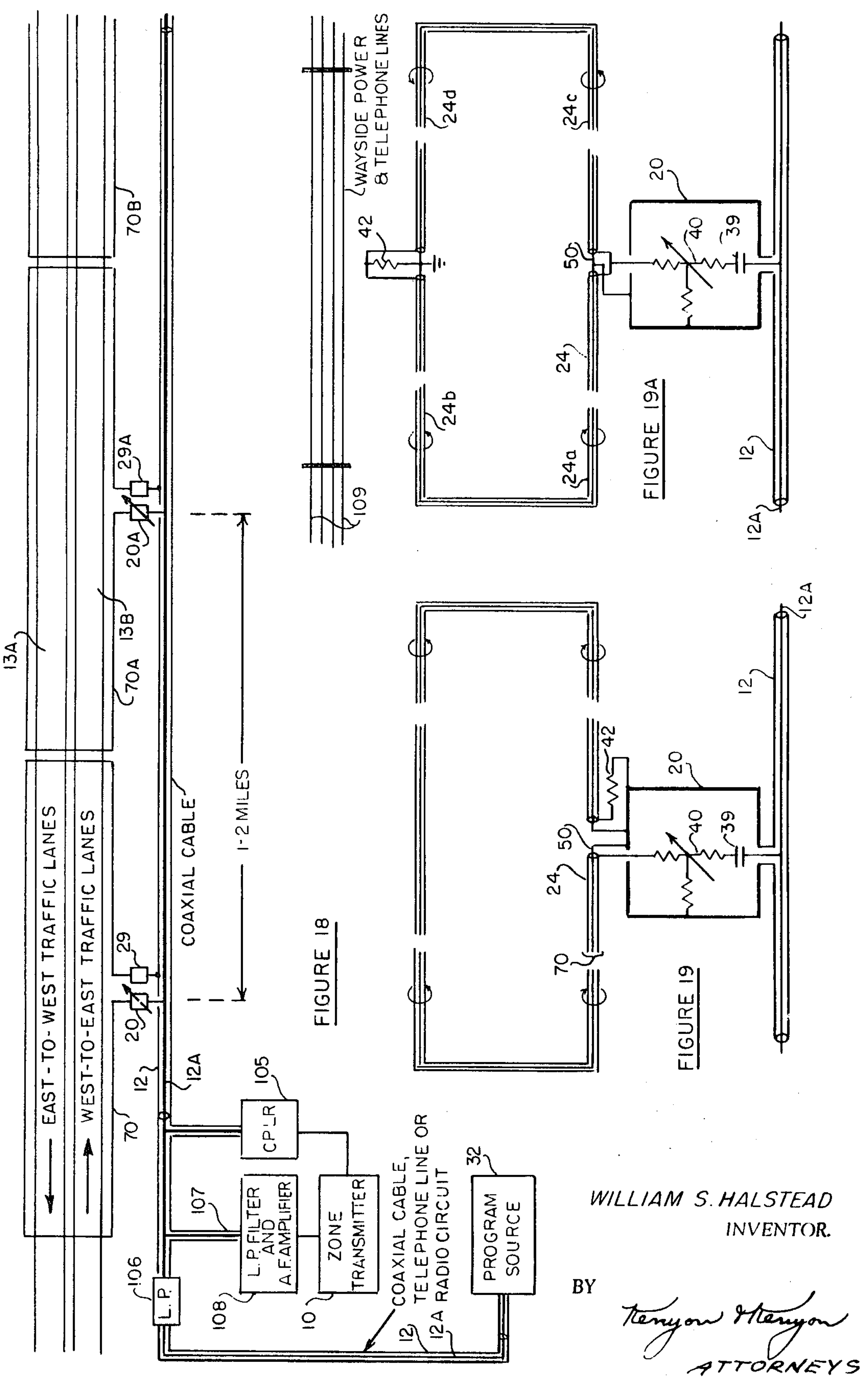
FIG. 18 is a diagrammatic view of another embodiment of the inductive carrier communication system of the present invention.
FIG. 19 is a schematic view of one form of loop configuration that may be used in the embodiment of the present invention shown in FIG. 18.
FIG. 19A is a modification of the loop configuration of FIG. 19.

After the cables are in place, the closure strips are positioned as shown in FIGS. 17 and 18. On completion of the roadway, each "V" member in effect forms a closed conduit in which cables may be added or removed at appropriately spaced junction points. Use of a nonmetallic closure strip 98 for the channel 97 in which the induction-signaling cable 25, is installed permits establishment of an external induction over the roadway area field for vehicle communication, signaling and control purposes.

DESCRIPTION OF FIG. 18

Referring now to FIG. 18, there is shown an inductive communication system in which trunk coaxial cable 12–12A, extending along a roadway 13A–13B carrying traffic in two directions, is supplied with carrier signals from zone transmitter 10 through line-coupling unit 105 of any well-known and suitable type. Signals from a program or other signal-originating center 32 may be carried by coaxial cable 12–12A or other suitable circuit through low-pass filter 106 and coaxial branch circuit 107 to the input of a low-pass filter (60–5,000 c.p.s.) and audio amplifier 108 whose output is connected to the signal input of transmitter 10, operating at an AM broadcast frequency such as 540 kc. In this illustrative example, coaxial cable connection between program source 32 and low-pass filter amplifier 108 is indicated as the signals from source 32 may, if desired, be one or more low frequency carrier signals below 100 kc. In this event the low-pass filter and amplifier unit 108 would be replaced by a band-pass filter and carrier receiver (not shown).

Carrier signals at a broadcast frequency such as 540 kc., as well as carriers of lower frequency thus can be carried along cable 12–12A. Carrier energy at the illustrative frequency 540 kc., as well as at lower carrier frequencies if desired for use with special communication receivers carried by vehicles, may be applied through line-coupling and RF attenuator unit such as 20 to inductive-signaling cable 70 such as that illustrated in FIG. 11, which in this case forms a transmission line in the form of horizontal loop extending from line-coupling and attenuator unit 20 around both traffic lanes 13A and 13B for a substantial distance such as ½–1 mile as indicated by the illustration. The far end of cable 70 is connected through termination unit 29 to the metallic ground circuit provided by ground sheath 12 of coaxial trunk cable 12–12A for reasons previously set forth. Such a loop configuration of the transmission line can present advantages when compared with use of separate cables along each roadway as tests have shown that a terminated transmission line arranged in loop configuration as shown will produce an induction field of maximum intensity within the area of the loop, in this example concentrating the most effect portion of the induction field within the roadway area.

Such loop configuration of the transmission line 70 also enables strong signals to be received in vehicles traveling along both traffic lanes 13A and 13B contained within the loop structure. However, unlike a conventional loop antenna designed to radiate carrier wave energy, the loop structure shown in FIG. 18 is a terminated two-conductor transmission line on which no standing waves appear, thereby it does not function as an antenna in the commonly accepted sense. Also, carrier energy at the AM broadcast carrier frequency and at the low carrier frequencies can effectively be received within the loop area since, unlike a loop antenna intended for radiation of carrier wave energy at a specific carrier frequency to which the loop is tuned in order to radiate wave energy to remote receiving points, the transmission line employed in the loop configuration shown in FIG. 18 is aperiodic and is not resonated in any manner. Exact impedance matching of the line at the termination point is established at the broadcast frequency where suppression of radiation is an important factor.

At a given distance (such as 1–2 miles) from line-coupling unit 20 along the coaxial cable 12–12A, a second line-coupling and RF attenuator unit 20A permits a regulated amount of signal energy at broadcast as well as at lower carrier frequencies to be applied to a second horizontal loop, formed by inductive-signaling cable 70A and encompassing the section of roadway 13A–13B, the roadway area served by the second loop being adjacent the roadway area served by the first transmission-line loop. Cable 70A is connected at its far end through termination unit 29A to the metallic ground provided by coaxial ground sheath 12.

DESCRIPTION OF FIG. 19

A schematic diagram of the inductive carrier transmission cable 70 formed in loop configuration is shown in FIG. 19. Carrier signal energy at broadcast and low carrier frequencies is applied through line-coupling capacitor 39 and attenuator 40 of line-coupling attenuator unit 20 to inductive-signaling conductor 24 which may be in the form of a coaxial sheath as shown or in spiral configuration as shown in FIG. 11. The center conductor 50 is held at ground potential. The far end of conductor 24 is connected through termination resistor 42 to the ground sheath of coaxial trunk cable 12–12A. As illustrated, current flow along conductor 24 toward termination resistor 42 causes the electromagnetic lines of force at any given instant to have the same polarity as related to direction of current flow at different points along the line, assuming that there is no wave reflection. If there are roadside power or telephone lines extending along the traffic lanes and in proximity thereto, as represented by overhead wires 109, FIG. 19A, a substantial amount of carrier energy will be induced on the overhead wires, which may lead to interference with other systems on the same carrier frequency or frequencies in other areas removed from the roadway that are served by the overhead lines. To minimize this coupling effect, a configuration of transmission line and circuit connections as shown in FIG. 19A may be employed. As in the illustrative arrangement of FIG. 19, carrier signal energy is applied from coaxial trunk cable 12–12A through line-coupling and attenuator unit 20 to the conducting sheath 24, formed as a split loop with current flow in sections 24*a* and 24*b* in opposite directions from that in sections 24*c* and 24*d* at any given instant, thus causing opposite polarity of the electromagnetic lines of force as indicated by the circular arrows in sections 24*a* and 24*c*, or 24*b* and 24*d*. The center ground conductor 50 of the coaxial cable of which sheath 24 is a part is connected to the ground sheath of trunk coaxial cable 12–12A. At the midpoint of the loop between sections 24*b* and 24*d* the inductive-signaling conductor 24 is connected to ground conductor 50 through termination resistor 42. As current flow from line-coupling and attenuator unit 20 along signaling conductor 24 is in two directions.

Assuming a perfectly balanced and terminated loop of this type, equal and opposing signal voltages will be induced on the roadside power or telephone lines 109 by loop sections 24*b* and 24*d* hence minimizing inductive transfer of signal energy.

DESCRIPTION OF FIG. 20

Figure 20:
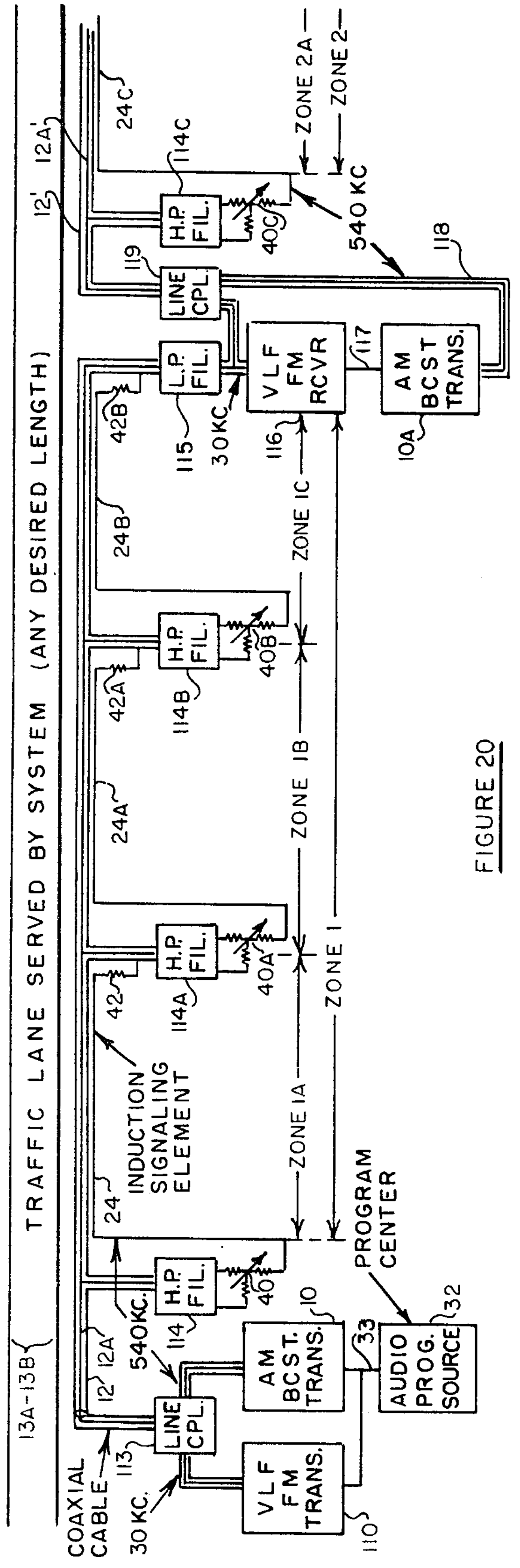
FIG. 20 is a diagrammatic view of an inductive carrier communication system according to the present invention in which there is included signal-relaying means for relaying signals over long highways.

FIG. 20 is illustrative of the operation of the system of the invention in relaying signals over long highways, retaining the same broadcast carrier frequency throughout lengths of roadway served by a plurality of relay or repeater transmitting units, with means for providing a relatively uniform induction field throughout the system. Audio program signals from a program source 32 are carried by line connection 33 to the signal inputs of (1) an AM transmitter 10 operating at a broadcast frequency such as 540 kc. and (2) a very low frequency (e.g., 30 kc.), FM transmitter 110 of narrow-band type (such as provided by deviation ratio of less than unity). The carrier signals from the two transmitters are impressed on coaxial trunk cable 12–12A through line-coupling unit 113 of any well known diplexer type having two inputs and a common output. Carrier energy at 540 kc. is applied from coaxial cable 12–12A through high-pass filter or coupling unit 114 and adjustable RF attenuator 40 to inductive signaling conductor 24 extending parallel and in proximity of coaxial trunk cable 12–12A or forming a part of a combined coaxial trunk and inductive-signaling cable of the types shown in FIGS. 5 through 9 and FIG. 12. Conductor 24 is terminated at its far end by means of impedance-matching resistor 42 to the ground sheath 12 of the coaxial trunk cable 12–12A thereby producing inductive field extending throughout the length of the conductor 24, designated as Zone 1A. At the beginning of Zone B, carrier energy at 540 kc. again is applied from coaxial trunk cable 12–12A through high-pass filter or coupling unit 114A and adjustable attenuator 40A to inductive-signaling conductor 24A, the end of which is connected to ground sheath 12 of coaxial cable 12–12A through termination resistor 42A, thereby forming an induction signaling field extending along Zone B. In similar manner, RF carrier energy at 540 kc. is applied at the beginning of Zone 1C from trunk cable 12–12A through high-pass or line-coupling unit 114B and attenuator 40B to inductive-signaling conductor 24B, the end of which is terminated by resistor 42B connected to ground sheath 12 of coaxial cable 12–12A providing an induction field extending along Zone 1C.

DESCRIPTION OF FIG. 21

Figure 21:
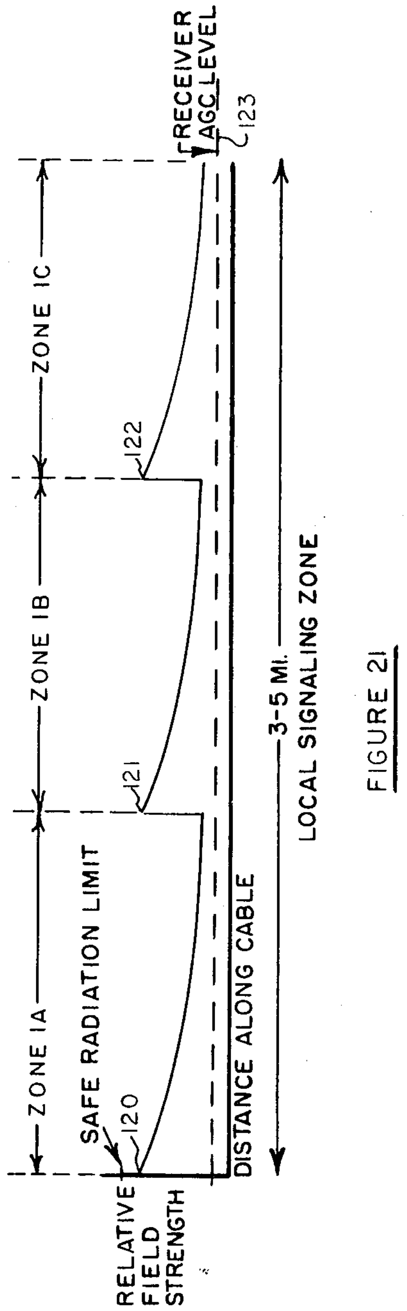
FIG. 21 is a plot of relative field strength versus distance along the cable shown in FIG. 20.

The attenuators 40, 40A and 40B at the beginning of each zone may be adjusted in such manner that the maximum field strength is kept at a desired value such as indicated at 120, FIG. 21, which is below the prescribed radiation limit of the FCC. The length of each inductive-signaling conductor 24, 24A and 24B is kept such that normal attenuation of the signal with length of line in each zone is held within limits such that the minimum field strength at the end of each Zone 1A, 1B and 1C is well above the value, indicated at 123, needed to fully stabilize the automatic volume control circuit of automobile receivers, thereby providing a received audio signal of substantially constant level as the car travels through the length of each zone.

Inasmuch as the line-coupling and attenuator units such as 114 and 40 respectively are passive devices, requiring no external source of power other than the radio frequency signal voltage that they transfer from coaxial line 12–12A to the inductive-signaling conductors such as 24, no maintenance problems such as tube or transistor replacements are involved. Sufficient carrier power can be provided at terminal transmitter 10 to feed a substantial number of zone signaling conductors, such as 24, 24A and 24B, without involving a radiation problem.

At the end of illustrative Zone 1, shown as 3–5 miles, the very low frequency (VLF) FM signal at 30 kc. is applied from coaxial trunk cable 12–12A through low-pass filter 115 to the signal input of a VLF FM receiver the audio output of which is applied through connection 117 to the signal input of a second AM transmitter 10A operating at a carrier frequency of 540 kc. As automatic limiter circuits of the FM receiver provide a relatively uniform output signal with respect to level changes in the audio signals applied to the input of transmitter 10A the low-frequency FM channel provides a means for interconnecting a plurality of roadside AM transmitters with a central programming point 32 in lieu of use of telephone lines or other circuits for this purpose. It is assumed that the audio input circuit of transmitter 10A would have an automatic limiting or compression amplifier circuit of any well-known type to minimize possibility of overmodulation by relayed program signals.

The 540 kc. carrier signal at the output of transmitter 10A is applied through line coupling unit 119 of diplex-input to coaxial trunk cable 12′—12A′. The low frequency carrier from transmitter 110 at the terminal point also is applied through the line coupling unit 119 for continued transmission along coaxial trunk cable 12′—12A′. It will be noted that coaxial cable section 12′—12A is isolated electrically from cable 12–12A with respect to the 540 kc. carrier frequency from transmitter 10A. Both the diplex coupling unit and the low-pass filter 115 effectively prevent any 540 kc. signal energy from transmitter 10A from being fed back along line 12–12A, thus eliminating phasing or heterodyne problems caused by interaction of the carrier used in the different zones.

Carrier signals at 540 kc. from zone transmitter 10A are applied through high-pass filter or line coupling means 114C and attenuator 40C to inductive signaling conductor 24C, the beginning of highway transmitting Zone 2, in the same manner as heretofor described.

DESCRIPTION OF FIG. 22

Figures 22, 23:
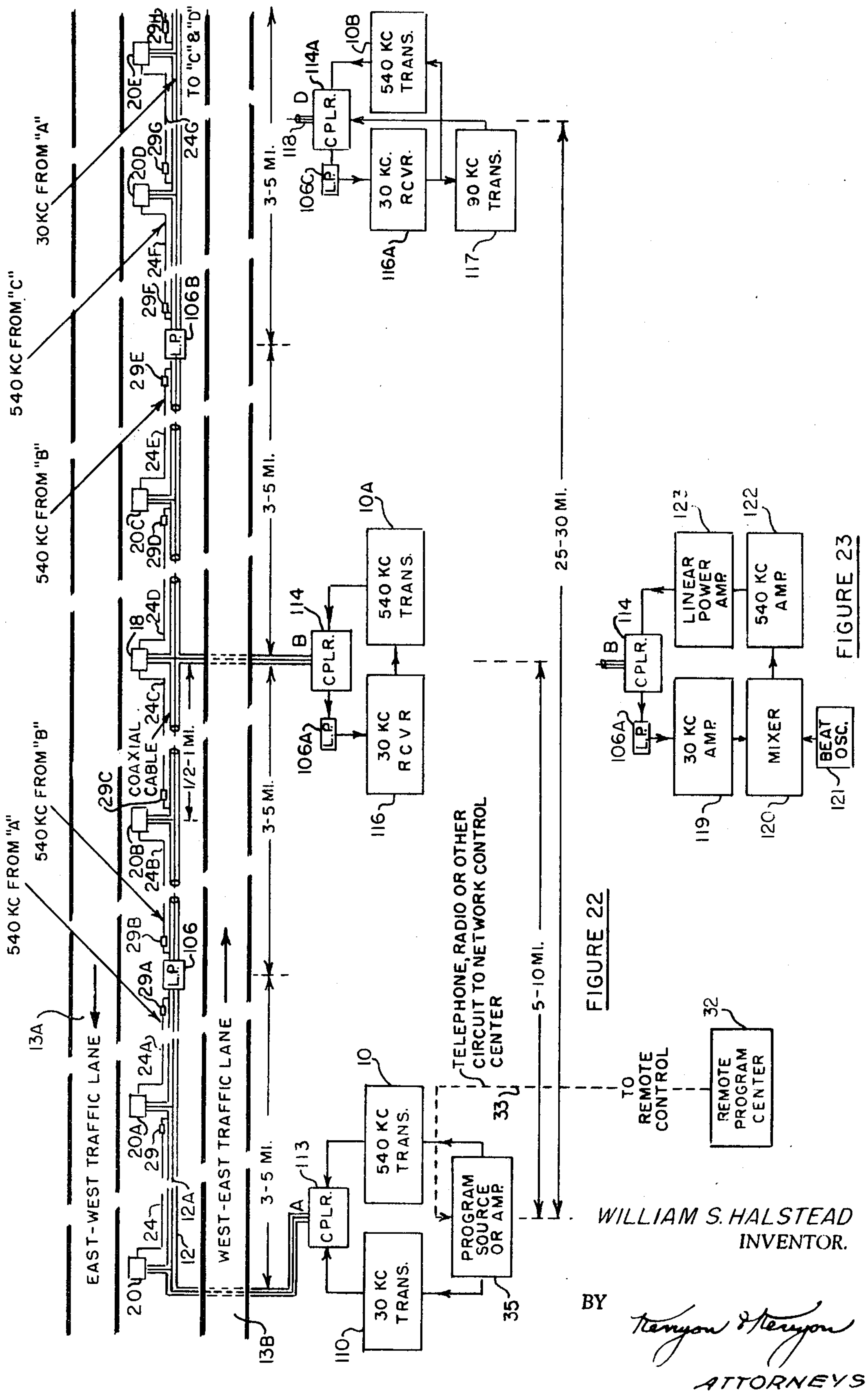
FIG. 22 is a diagrammatic view of an inductive carrier communication system according to the present invention in which there is included a preferred form of signal-relaying means for relaying signals from a central point.
FIG. 23 is a diagrammatic view of an alternate form of signal-relaying means that may be used in the system of FIG. 22.

FIG. 22 illustrates one preferred means that may be employed in relaying signals from a central point such as remote program center 32, local program source or amplifier 35, or other suitable signal source to provide communication with radio-equipped vehicles or other radio receiving points within a localized signaling area. As shown in FIG. 22, the localized signal area is formed by traffic lanes 13A and 13B, carrying vehicular traffic in opposite directions, served by the coaxial trunk and inductive-signaling cable comprising coaxial cable 12–12A and inductive-signaling conductors 24, 24A, 24B, 24C, 24D, 234E, 24F and 24G, extending over a total distance of 12–20 miles in this illustrative system. The inductive signaling conductors are connected to coaxial line 12–12A in manner previously described by line-coupling units 20, 20A, 20B, 18, 20C, 20D and 20E as shown and to the common ground sheath 12 of coaxial cable 12–12A by terminal units 29, and 29A through 29G respectively.

Low frequency carrier transmitter 110 feeds signal energy at a frequency such as 30 kc. through any well-known diplex line-coupling means 113 to coaxial trunk cable 12–12A. In like manner, carrier signal energy at a designated frequency in the standard AM broadcast band, such as 540 kc., also is applied through diplex filter 113 to coaxial trunk cable 12–12A, which may be of the structure shown in FIGS. 5–9, inclusive, combining the coaxial trunk conductors 12–12A and inductive-signaling elements 24, 24A through 24G. In this illustrative arrangement of the system, the frequency of trunk carrier transmitter 110 is one of the subharmonics, 30 kc., of the broadcast frequency 540 kc.

By means of line-coupling units 20 and 20A a regulated amount of carrier signal energy at 540 kc. (and 30 kc. if desired for use in reaching special receivers used by vehicles) is applied to inductive-signaling conductors 24 and 24A, the ends of which are connected through termination units 29 and 29A, respectively, to common ground sheath 12, thereby forming an inductive signaling field extending laterally across traffic lanes 13A and 13B and longitudinally for the lengths of the two conductors 24 and 24A—a total distance of 3–5 miles in the illustrative example. At the end of this first 3–5 mile zone, it is assumed that the power level of the 540 kc. carrier has been reduced by transmission losses in trunk cable 12–12A in the point where it cannot supply further effective signal energy to additional inductive-signaling conductors such as 24B and 24C, thus requiring a repeater or other relay means to extend the transmission range of the system at 540 kc.

Since the transmission losses of the 30 kc. carrier have been appreciably less than the losses of the 540 kc. carrier, signal energy from the former is utilized to produce a new 540 kc. carrier signal to bring about this extension of range. This is accomplished by use of a repeater at a point, B, along the cable. As shown, repeater B comprises a 30 kc. relay receiver 116 and an associated 540 kc. relay transmitter 10A. Carrier energy at a frequency of 30 kc. as supplied by terminal transmitter 110 is applied by coaxial branch connection with trunk coaxial cable 12–12A through line-coupling unit 114 of any well-known type and low-pass filter 106A (with cutoff above 40 kc.) to the signal input of relay receiver 116. Receiver 116 demodulates the 30 kc. carrier and applies to derived audio program signals to the signal input of a 540 kc. relay transmitter 10A of any well-known crystal-controlled or automatic frequency control (AFC) type. The 540 kc. signal output of transmitter 10A then is applied through line coupler 114, of any suitable and well-known diplex input type, to coaxial trunk cable 12–12A. To prevent the original carrier signal at 540 kc. from being transmitted forward along the same section of trunk cable 12–12A that carries the 540 kc. signal from transmitter 10A, a low-pass filter 106 is inserted in the coaxial trunk circuit at the point where termination unit 29A is situated, blocking forward passage of the 540 kc. signal from transmitter 10 and backward passage of 540 kc. carrier signals from source 10A along trunk cable 12–12A beyond the zone within which transmitter 10A is associated. However, the 30 kc. trunk carrier from terminal transmitter 110 is passed forward through filter 106 without any marked attenuation. Low-pass filter 106A prevents feedback of the locally produced 540 kc. carrier from zone transmitter 10A into the relay receiver 116.

In the same manner as hereinabove described, with respect to the first signaling zone, carrier signals at 540 kc. from transmitter 10A (as well as the 30 kc. signals, if desired) are applied from coaxial trunk cable 12–12A to inductive signaling conductors 24C–24D, 24B and 24E through line-coupling attenuator units 18, 20B and 20C, respectively. The ends of conductors 24C, 24D, 24B and 24E are connected to common ground sheath 12 of coaxial cable 12–12A through termination units 29C, 29D, 29B and 29E, respectively. The inductive signaling field in this zone thus extends from termination unit 29B to termination unit 29E over the illustrative distance of 6–10 miles. As a 540 kc. carrier frequency is employed throughout the two zones extending from line-coupling and attenuator unit 20 to termination unit 29E, and as a relatively uniform signaling field is maintained along the cable for this distance, vehicular receivers will provide a uniformly strong audio signal without change in tuning or volume controls as the vehicles proceed throughout the length of the cable served by that portion of the system that has been described.

At the end of the useful service range of zone transmitter 10A, a low-pass filter 106B is inserted in the trunk coaxial cable 12–12A to block forward passage of the 540 kc. carrier along the cable. The 30 kc. trunk carrier, however, is passed without any significant attenuation and at subsequent repeater points, such as at points "C" (not shown) and "D" along the cable, is utilized in the same manner as described in connection with explanation of the functions of relay receiver 116 and transmitter 10A.

At relay point "D," for example, the 30 kc. trunk carrier from terminal transmitter 110 is applied from coaxial trunk cable 12–12A through branch coaxial cable 118, line-coupling unit 114A, and low-pass filter 106C to the RF signal input of 30 kc. receiver 116A. The demodulated program signals then are applied to the audiofrequency signal input of 540 kc. relay transmitter 10B, modulating its carrier. It is assumed that, in accordance with good engineering practice, adequate automatic limiter or compression amplifier circuits will be utilized either in the audio-output circuit of the 30 kc. receiver 116A or in the AF input circuit of zone transmitter 10B, and that precision crystal control or automatic frequency control circuits will be utilized in zone transmitter 10B to hold the operating frequency on 540 kc.—the common roadside broadcast frequency to which vehicle receivers are tuned.

The modulated carrier signals from transmitter 10B are applied to a signal input of line-coupling unit 114A of any well-known type having two or more inputs and thence through branch coaxial cable 118 to trunk coaxial cable 12–12A. Passage of the 540 kc. carrier from zone transmitter 10B back along trunk 12–12A beyond its service area is prevented by low-pass filter means 106 as previously described. Any feedback of the 540 kc. carrier from zone transmitter 10B through its receiver 116A is prevented by low-pass or band-pass filter 106C, which blocks passage of the locally generated 540 kc. signal at this point into receiver 116A.

Assuming that a relay point D the original 30 kc. carrier from terminal transmitter 110 has diminished in power in traveling along trunk cable 12–12A to the point where a trunk carrier relay or repeater is required to reach additional sections of the roadside system, a low frequency relay transmitter 117 may be used at location D to reestablish a strong trunk carrier signal, such as provided at the output of relay transmitter 117, the 90 kc. carrier of which is modulated by audio signals from relay receiver 116A. As illustrated, the 90 kc. trunk carrier then is applied through the second input of line-coupling unit 114A to coaxial branch cable 118 and trunk cable 12–12A. The 90 kc. carrier is prevented from feeding back into the signal input of relay receiver 116A by means of low-pass or band-pass filter 106C. The 90 kc. carrier also is prevented from traveling back along trunk cable 12–12A beyond the zone with which transmitter 10B is associated by means of a low-pass filter (not shown), similar to 106B.

DESCRIPTION OF FIG. 23

An alternative method of relaying signals at points such as "B" FIG. 22 is illustrated in FIG. 23 where the 30 kc. carrier from terminal transmitter 110, FIG. 22, is applied from coaxial trunk cable 12–12A through line-coupling unit 114, thence through low-pass filter 106A to the RF signal input of a 30 kc. amplifier 119 which is tuned precisely to this carrier, is linear in response and has no distortion within the 10 kc. band, occupied by the carrier and modulation sidebands, extending, in this illustrative example, a maximum of 5 kc. on both sides of the carrier. The amplified 30 kc. carrier then is applied from the output of amplifier 119 to one input of combiner of mixer 120, having a second input into which is fed a crystal-controlled or AFC carrier from best oscillator 121 at an illustrative frequency of 570 kc., producing at the output of the mixer 120 a difference frequency of 540 kc., the latter modulated by the original audio program signals from source 32. This new 540 kc. carrier, as frequency translated from 30 kc., then is fed to the RF signal input of a tuned 540 kc. amplifier 122, having linear response over an illustrative 10 kc. band occupied by the 540 kc. carrier with its upper and lower sidebands, each extending a maximum of 5 kc. from the carrier, assuming that a double-sideband AM system is used. However, it is emphasized that the carriers may be of compatible single-sideband type, useful with standard AM broadcast receivers, or they may be of narrow-band frequency or phase-modulated type. As will be described hereinafter, the latter frequency or phase modulated signals my be received on standard car AM broadcast receivers by well-known slope detection methods in which the receiver is tuned off center frequency at either side of certain carrier.

Again assuming a conventional double-sideband AM carrier for this illustration, 540 kc. amplifier 122 effectively passes and amplifies the 540 kc. carrier and its sidebands without distortion or change in the modulation envelope and without demodulation and remodulation being involved in the relay process. 540 kc. amplifier 122, while effectively passing the 540 kc. carrier and sidebands, does not amplify or pass signal energy outside of this band that might exist at the output of combiner or mixer 120.

The amplified 540 kc. carrier, is then applied from amplifier 122 to the RF input of linear power amplifier 123, which is tuned to pass a 10 kc. band centered at 540 kc. The output carrier signal from amplifier 122 is fed to one of the RF signal inputs of diplex line coupler 114, thence to trunk cable 12–12A. Feedback of the 540 kc. signal into relay amplifier 119 is prevented by low-pass filter 106. By this means, the problems involved in unattended relay operation, such as distortion due to demodulation and remodulation, with possibility of overmodulation of the carrier in the relay process, are avoided.

The method of frequency translation employed in the arrangement of FIG. 23 is especially advantageous when frequency or phase modulated carrier signals are employed. In such a case the carrier is of constant and maximum amplitude at all times, readily lending itself to automatic limiting techniques that maximize performance of a relay system throughout its entire length, requiring no de-modulation or remodulation at any point in the relay chain and avoiding change in the original modulation pattern as produced at the initiating terminal. It will be understood, therefore, that the use of specific demodulation and remodulation methods as shown in FIG. 22 are for illustrative purposes only and that no limitation as to mode of modulation is thereby intended.

DESCRIPTION OF FIGS. 24, 24A AND 24B

Figures 24, 24A, 24B, 24C:
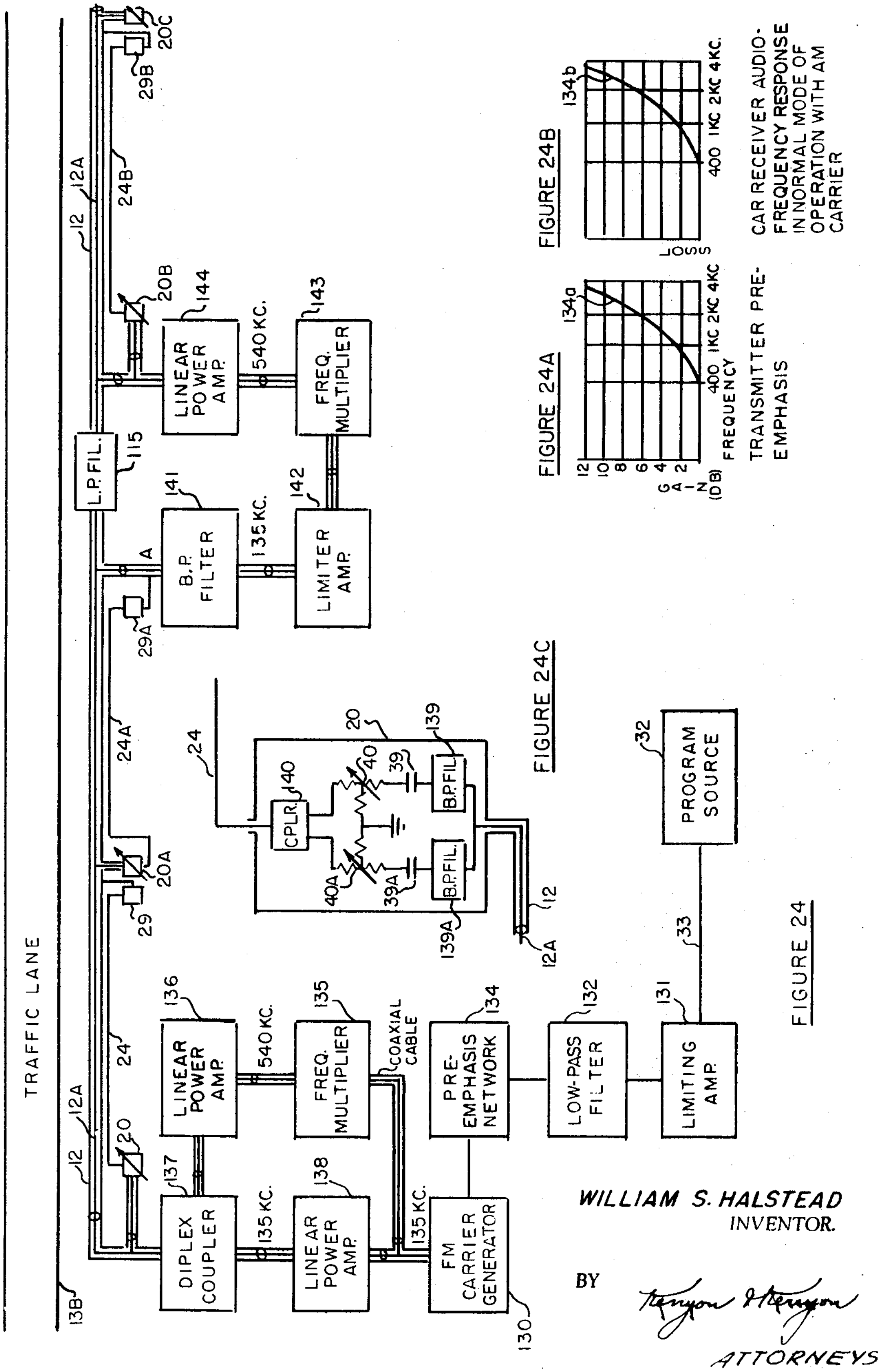
FIG. 24 is a diagrammatic view of an inductive carrier communication system according to the present invention in which there is included signal-relaying means employing frequency or phase modulation methods.
FIG. 24A is a plot of the preemphasis characteristic curve of the preemphasis network of FIG. 24.
FIG. 24B is a plot of power loss versus frequency at the loudspeaker circuit of a typical motor vehicle AM broadcast receiver.
FIG. 24C is a modified form of line-coupling attenuator unit that may be used with the system of FIG. 24.

Referring now to FIG. 24, there is shown an inductive carrier system as applied in roadway communications along a traffic lane such as 13B in which frequency or phase modulation methods are employed to maximize performance as related to the relay process and to improve audiofrequency response in vehicle receivers of standard AM type in which the higher audiofrequencies above about 2,000 cycles normally are attenuated or suppressed because of band-pass restrictions incorporated in the receiver circuitry to improve selectivity and reduce electrical noise. As shown, a narrow-band FM carrier generator or transmitter, 130, having a small carrier deviation such as ±1 kc., is modulated by audio program signals originating at program source 32. Source 32 supplies audio signals via telephone line or other communication circuit 33 to limiting or compression amplifier 131 whose output is connected to low-pass filter 132, having a designated cutoff frequency such as 5 kc. to restrict audio bandwidth. The output of filter 132 provides audio signals below 5 kc. to preemphasis network 134 of any well-known type whose output is connected to the AF signal input of transmitter 130. Preemphasis network 134 acts to increase the power level of audio program signals above 400 cycles so as to compensate for the attenuation of the higher audio frequencies in the desired passband, particularly in the range 2,000–5,000 cycles, as presented at the audio-output circuit of conventional AM broadcast receivers in general use in motor vehicles due to selectivity requirements of RF circuitry or for other reasons.

A pictorial representation of the transmitter preemphasis curve 134A (FIG. 24A) provided by the preemphasis network 134 (FIG. 24) illustrates a rapid rise in frequency response to compensate for the degree of frequency attenuation shown in curve 134B (FIG. 24B), representing power loss vs frequency at the loudspeaker circuit of a typical AM broadcast receiver of the type commonly employed in motor vehicles.

The audiofrequency program signals as limited in amplitude and frequency rage and as preemphasized with respect to the higher audio frequencies above 400 cycles per second are applied to the signal input of the FM carrier-generator or transmitter unit 130 having an illustrative center frequency of 135 kc., in this case a subharmonic of the roadway carrier frequency 540 kc. for reasons to be explained in subsequent paragraphs. The ±1 kc. frequency deviation range of the modulated carrier from FM carrier generator 130 as caused by the applied audio signals is increased to ±4 kc., in this illustrative case, by passing the FM carrier through a frequency multiplier 135, of any well-known type, having multiplication factor of 4 times. This results in a 540 kc. FM carrier having ±4 kc. deviation at the output of the multiplier 135. This 540 kc. narrow-band FM carrier signal is passed through a linear power amplifier 136 which uniformly amplifies the 540 kc. carrier as frequency-modulated to a diplex line-coupler 137 of any well-known type whose output is connected with coaxial trunk cable 12–12A extending along roadway 13B as hereinabove described.

The original FM carrier from FM carrier generator 130 at a center frequency of 135 kc. also is applied through a linear power amplifier 138, designed to amplify without distortion the 135 kc. FM carrier and modulation sidebands. The amplified 135 KC FM carrier then is applied to an input of diplex line-coupler 137, whose output is connected with coaxial trunk cable 12–12A.

In manner as hereinabove described, carrier signals as applied to coaxial trunk cable 12–12A are applied through line-coupling and attenuator units 20 and 20A to inductive signaling conductors 24 and 24A, respectively, the ends of which are connected to coaxial ground sheath 12 through termination units 29 and 29A, respectively. If it is desired to individually regulate the amount of RF signal voltage at each of the two carrier frequencies as applied to inductive signaling conductors, such as 24, the 540 kc. FM carrier may be applied from trunk cable 12–12A through a band-pass filter 139, FIG. 24C, installed in line-coupling attenuator unit 20. The 540 kc. carrier then is applied through coupling capacitor 39 to adjustable attenuator 40 whose output is connected with a diplex line coupling unit 140 or any other suitable and well-known mixer whose output is connected with inductive-signaling conductor 24. In like manner, the 135 kc. FM carrier signal is transmitted from coaxial trunk cable 12–12A through low-pass filter 139A, thence through coupling capacitor 39A to adjustable attenuator 40A whose output is connected to the second input of diplex line-coupler 140. By adjusting the two attenuators 40 and 40A, a desired RF signal voltage at either of the two carrier frequencies can be applied to inductive signaling conductor 24, thus adapting the system to provide optimum performance when used in association with standard AM broadcast receivers or with special FM receivers at frequencies below the broadcast band.

As is now visualized by highway engineers and organizations that are responsible for road construction and operation, such low frequency FM receivers may, in the future, be employed as a functional part of vehicles for traffic control and assorted signaling or communication purposes, possibly utilizing a standard frequency that may be allocated on a regional or national basis for the purpose of improving highway safety and efficiency of operation. By the use of two frequencies, as described, it is possible to provide a highway communication system that is useful and fully compatible with existing automobile receivers as well as with future low frequency receivers that may operate on a common channel or channels allocated for highway use on a national or international basis. At the same time, the system can be adjusted so that at each of the two carrier frequencies its operation will comply with regulations of the FCC with respect to permissible field strength at a given frequency.

At a point such as "A" along coaxial trunk cable 12–12A, where it is necessary to increase the strength of the 540 kc. FM roadway carrier the 135 kc. FM trunk carrier is applied through a band-pass filter 141 to a limiter amplifier 142 whose output is applied to the input of frequency multiplier 143 which multiplies the frequencies of the 135 kc. FM carrier to its 4th kc., in the same manner as accomplished by the frequency multiplier 135 at the originating terminal, The new 540 kc. signal then is applied through linear power amplifier 144 to the coaxial trunk cable 12–12A. A low-pass filter 115, in series in the coaxial trunk cable 12–12A, prevents passage of the 540 kc. FM carrier from amplifier 144 back along coaxial cable 12–12A toward the terminal point and restricts it to the forward section of the trunk cable 12–12A in the direction of line-coupler/attenuator 20C. Filter 115 also prevents forward passage of the 540 kc. carrier from the terminal point where FM carrier generator is located, thus effectively electrically isolating the two adjacent zones in which 540 kc. signals are employed. However, the 135 kc. trunk carrier from the terminal passes effectively through filter 115 without any significant attenuation. The 540 kc. FM carrier from amplifier 144 also is applied from coaxial trunk cable 12–12A through line-coupler/attenuator unit 20B to inductive signaling conductor 24B, the end of which is connected to the common ground sheath 12 of coaxial trunk cable 12–12A through termination unit 29B.

This frequency translation and amplifying process, as described, may be repeated indefinitely without change in the original modulation characteristics of the signal since no demodulation and remodulation is involved, thus avoiding the problems of distortion and overmodulation that normally are presented at unattended relay points when received carrier signals are demodulated to recover the audiofrequency signal which then modulates a new carrier at the relay point. By use of frequency modulation throughout the system, the relay process is simplified and distortion is avoided as the constant amplitude characteristic of an FM carrier signal adapts itself readily to automatic limiting, as at limiting amplifier 142, thus ensuring that the frequency multiplier 143 is always supplied with an input signal at constant voltage, avoiding overloading of the input circuit of the multiplier and subsequent power amplifier 144.

The dual channel FM relay system shown in FIG. 24 also presents certain operational advantages as related to performance when standard AM broadcast receivers are used in vehicles traveling along traffic lane 13B, and especially as related to performance when special low frequency FM receivers are employed in vehicles. With respect to the former, it may be noted that reception of the narrow-band FM carrier signal at 540 kc., or other broadcast frequency, by standard AM receivers, is accomplished by well-known slope detection method in which the AM receiver is tuned slightly below or above the center frequency. This method can also assist, in some instances, in minimizing interference. For example, in the event that a local high-power AM broadcast station is on a carrier frequency of 560 kc., the lower sideband of this station will extend to 550 kc. under normal AM broadcast practice, thus causing an interference problem in receiving a 540 kc. roadway signal if a conventional double-sideband AM signal extending 10 kc. above and below 540 kc. were to be employed by the roadway system, since there would be no guard band between the signals from the two transmitters. However, with the narrow-band FM system, as shown in FIG. 24, AM car receivers may be tuned for slope detection to a point slightly below the center carrier frequency of 540 kc., thus minimizing interference from the 560 kc. station that would exist in many receivers were an AM double-sideband method to be employed by the 540 kc. roadside transmitting system.

Tests of narrow-band FM reception at a carrier frequency in the broadcast band, employing the slope detection method with standard AM broadcast receivers, have shown that while the amplitude of the recovered audio signal is not as great as that from a double-sideband AM carrier, quality of the received audio signals is excellent. As it is assumed that the field strength in proximity to the roadside cable will be high at all times, thus providing good quieting action in the receiver, the amplitude of the recovered audio signals can readily be brought up to a desired level by adjustment of the volume control without noticeable increase in background noise level.

DESCRIPTION OF FIG. 25

Figures 25, 25A:
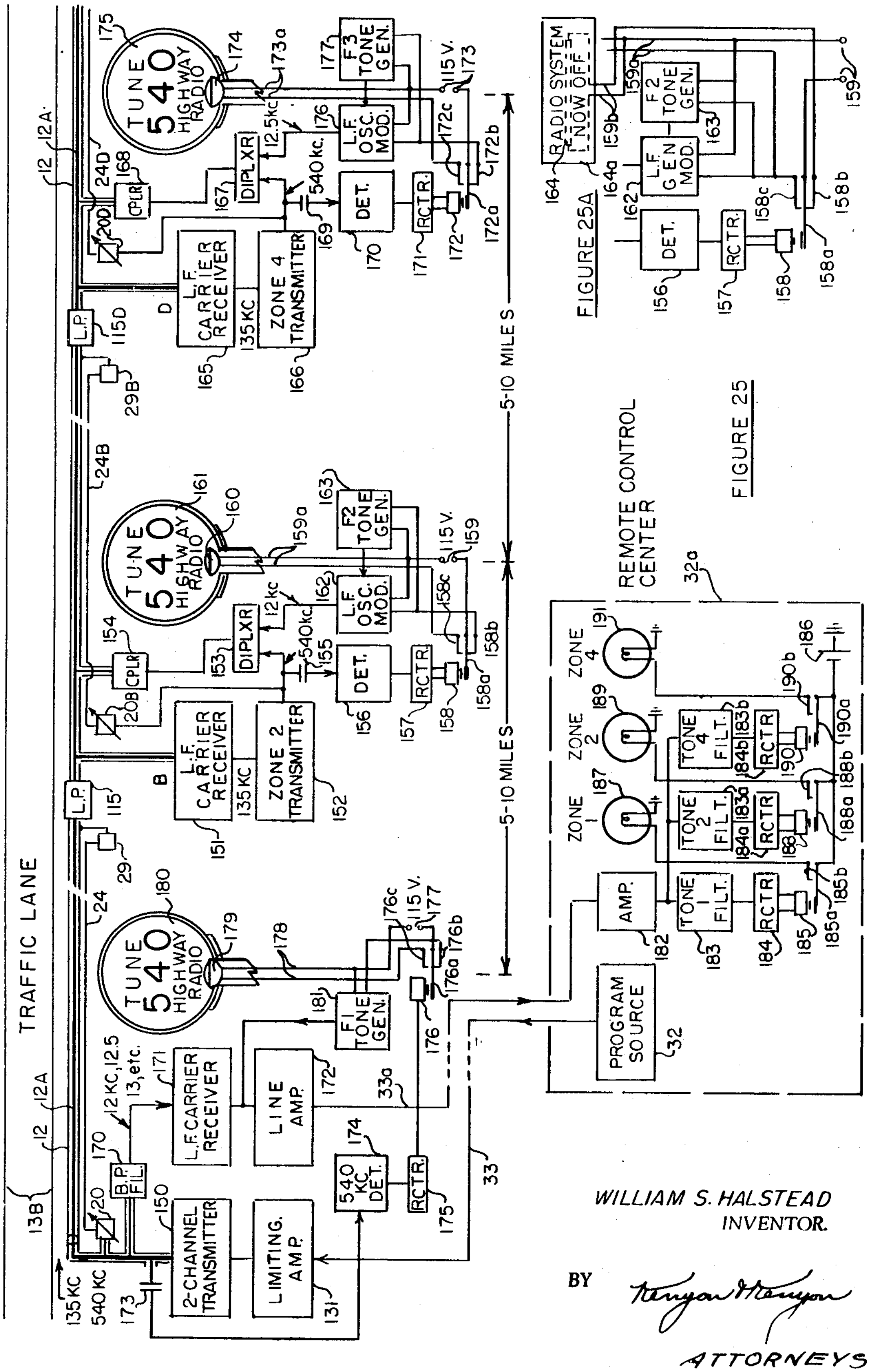
FIG. 25 is a diagrammatic view of a roadway communication system of the type shown in FIG. 20, in which automatic visual indicating means are provided to show the operative or inoperative conditions of roadside transmitting and relay equipment.

FIG. 25 illustrates a roadway communication system, employing the inductive-signaling cable arrangement as shown in FIG. 20, in which automatic means are provided to visually indicate at roadside and central control points the operative or inoperative condition of roadside transmitting and relay equipment. In this arrangement, audio signals from a central program source 32 at remote control center **32*a* are transmitted by wireline or other communication circuit 33 to the input of limiting amplifier 131 of any well-known type whose function is to provide at its output a relatively high audio signal level with limitation of program peaks within a given range to avoid overmodulation of its associated transmitter 150. Transmitter 150 is preferably of two-channel type incorporating a low frequency transmitter such at 110, FIG. 20, preferably of narrow-band FM type, and a broadcast-band transmitter such as AM transmitter 10, FIG. 20, or a narrow-band FM transmitter such as shown by the FM carrier generator 130, FIG. 24, with its associated frequency multiplier 135 and power amplifier 136. The RF output of the two-channel transmitter 150 is applied to coaxial trunk cable 12–12A extending along traffic lane 13B. As heretofore described, carrier signals at illustrative frequencies such as 135 kc. and 540 kc. from dual channel transmitter 150 may be applied from trunk cable 12–12A through line coupling attenuator unit 20 to inductive-signaling conductor 24 extending along roadway 13B, connecting through termination unit 29 to coaxial trunk cable 12–12A**.

At some point along the cable 12–12A where the 540 kc. carrier requires amplification, such as at point B, low frequency receiver or amplifier 151 and associated zone transmitter or amplifier 152, converts the 135 kc. trunk carrier by frequency multiplication to its 4th harmonic, 540 kc., by method shown at repeater location A, FIG. 24, assuming that FM is employed throughout. This 540 kc. signal then is used for inductive-signaling purposes in Zone 2. The relay process may alternatively comprise the heterodyne method shown in FIG. 23, as previously described, or conventional demodulation and remodulation methods may be employed, using an FM receiver such as 116, FIG. 20, to demodulate the 135 kc. trunk carrier, then applying the received audio signals to modulate an AM relay transmitter such as 10A, FIG. 20. The 540 kc. signals from transmitter 152 are applied through a diplexer or mixer 153, of any well-known type, whose output is connected through line coupling unit 154 to trunk coaxial cable 12–12A. Low-pass filter 115, inserted in series in coaxial trunk cable 12–12A prevents passage of the 540 kc. carrier from transmitter 152 back along trunk cable 12–12A, toward the terminal where transmitter 150 is located. This filter also prevents the passage of the 540 kc. carrier from source transmitter 150 forward along the cable into Zone 2. However, filter 115 allows transmission of the 135 kc. trunk carrier from terminal transmitter 150 in forward direction along the cable. The 540 kc. roadway carrier also is applied as shown from the output of zone 2 transmitter 152 through line-coupling/attenuator unit 20B to inductive signaling conductor 24B, the end of which is connected through termination unit 29B to the ground sheath 12 of coaxial cable 12–12A.

A small amount of the 540 kc. signal from zone 2 transmitter 152 also is applied through coupling capacitor 155 to a carrier detector unit 156 which demodulates the carrier. Detector 156 may be any suitable type, well known to those skilled in the art, which is capable of recovering audio signals from the modulated carrier signal. The recovered program signals from the detector within a selected midrange audiofrequency band, such as 500–1,000 cycles, then are applied to rectifier unit 157 of any well-known half-wave or full-wave type, supplying DC voltage to operate relay 158. Relay 158 is preferably of slow release type adjusted to hold armature **158*a* in upward position for 10–15 seconds or longer, as desired, before release in event no audio program signal is received by detector 156, in order to avoid undesired release of the armature in response to brief silent intervals in the program. As long as program signals are being received by detector 156 from program source 32, DC voltage is applied to relay 158, causing connection of the are 158*a* with upper contact 158*c*, thereby applying, through conductors 159*a*, voltage from local power source 159 to lamp 160 or other light source employed to illuminate the "Tune 540" sign 161 on the roadside adjacent zone transmitter 152, indicating to operators of vehicles that the system is in operation at 540 kc. In event of failure of any portion of the entire system, from program source 32 to the relay 158, the latter will not be energized and after a predetermined number of seconds, s determined by the slow release characteristics of the relay, arm 158*a* will drop, opening the circuit between power source 159 and lamp 160, thus darkening sign 161. It is assumed that the sign will be of any well-known type, painted, letters and numerals formed of neon tubing or of other design in which letters or numerals cannot be read in event of lack of illumination by the light source 160 associated with the sign. If desired, relay 158 can be used to actuate an auxiliary "System Inoperative" sign shown as 164*a*, by connecting the lower contact 158*b* of the relay 158 to light source 164 of the auxiliary sign through conductors 159*b***.

In FIG. 25, the lower relay contact **158*b* is utilized as shown to apply voltage from source 159 to a low frequency carrier oscillator/Modulator or carrier generator/modulator unit 162, operating at an illustrative frequency of 12 kc., and a tone generator 163, operating at a specific audio frequency F2, such as 40 cycles per second. Thus, in event of failure of any part of the system from source 32 to relay 158, the 40-cycle tone signal modulating the 12 kc. carrier will be transmitted back along coaxial trunk cable 12–12A to the originating terminal where transmitter 150 is located and subsequently relayed to the remote control center 32*a* to selectively operate a visual signal, identifying the zone transmitter by number, provided to indicate operative or inoperative condition of the zone 2** roadside equipment at location B, as will be described hereinafter.

An alternative arrangement of the connections associated with relay 158, low frequency carrier generator/modulator 162 and tone generator 163 is shown in FIG. 25A, wherein relay arm **158*a* when activated so as to make contact with upper contact arm 158*c* applies operating voltage from source 159 to low frequency carrier generator/modulator 162 and tone generator 163, thus causing transmission of the 12 kc. carrier, modulated by the illustrative 40-cycle tone signal, back along coaxial trunk cable 12–12A to the originating terminal where transmitter 150 is located. In this instance the 40-cycle tone signal will be used at the remote control point 32*a*, as will be described hereinafter, to indicate presence of a relayed program signal at monitor detector 156 located at roadside point B; failure of any part of the system from program source 32 to relay 159 at roadside point B will, when using the arrangement shown in FIG. 25A, cause the non-reception of the 40-cycle tone signal from point B at the remote control center 32*a***, thus visually indicating inoperative condition of the system as checked continuously and automatically at roadside point B.

In manner as described in foregoing paragraph, the system can be extended from the program source 32 to other roadside relay equipment along trunk cable 12–12A. At roadside point D, for example, the 135 kc. trunk carrier from coaxial trunk cable 12–12A is applied through low frequency carrier receiver or amplifier 165 in manner described hereinabove; the resulting frequency-translated carrier, at 540 kc. from zone 4 transmitter or amplifier 166 is applied through diplexer unit 167 to line-coupler 168, thence to coaxial trunk cable 12–12A. A small amount of 540 kc. carrier voltage is applied to inductive signaling conductor 24D from zone transmitter 166 through line-coupler/attenuator unit 20D in previously described manner. A small amount of carrier voltage from transmitter 166 also is applied through coupling capacitor 169 to detector 170. Audiofrequency program signals, as derived from the output of detector 170, are fed to rectifier 171, providing DC voltage for operation of relay 172. As in the arrangement described hereinabove, movement of arm 172*a* to contact arm 172*c*, when the relay is energized by DC voltage derived from the received program signals, will apply voltage to conductors 173*a* from local power source 173, causing light source 174 to illuminate roadside "Tune 540" sign. Failure of received and relayed program signal from program source 32, as checked by detector 170 at roadside point D, will cause relay arm 172*a* to drop down to connect with contact arm 172*b*, thus causing transmission of a low frequency carrier, at a frequency such as 12.5 kc., modulated by a tone of specific frequency, such as 50 cycles. The 12.5 kc. carrier signal is applied through diplexer 167 and line-coupler unit 168 to the coaxial trunk cable 12–12A, the latter carrying the signal back along the cable to the terminal where transmitter 150 is located. From this point the tone signal is transmitted, as will be described, to the remote control center 32*a*, where it is utilized to selectively actuate a visual signal indicating operative or inoperative condition of equipment at roadside point D.

As shown in FIG. 25, the Monitor or checking carriers at illustrative frequencies of 12 kc. (from roadside point B), and 12.5 kc. (from point D) are applied from trunk cable 12–12A through band-pass filter 170 at the terminal where transmitter 150 is located, to a low frequency carrier receiver 171 having adequate RF bandwidth capability to accept a group of monitor carriers such as 12 kc., 12.5 kc., 13 kc., etc., in sufficient number to enable checking of operation at all roadside points served by the system from control center 32*a*. This receiver 171 may also be of any well-known multichannel type with RF circuits tuned to each carrier and having a common audio output circuit. The received audio signals, such as 40-cycle tone from roadside point B and the 50-cycle tone from point D are passed through any well-known line amplifier 172 and are carried via telephone line 33*a* or other communications circuit to the remote control center 32*a*.

To provide a check on operation of the system at the terminal point where transmitter 150 is situated, a small amount of carrier voltage is applied through coupling capacitor 173 to a tuned 540 kc. detector 174 effectively responsive only to the strong 540 kc. signal from its associated local transmitter 150. The resultant audio program signals from detector 174 are applied to rectifier 175, providing DC voltage for operation of relay 176. In the same manner as has been described in connection with the operation of roadside equipment at other locations such as points B and D, when relay armature 176*a* is drawn upward to connect with contact arm 175*c*, as occurs when rectified program signals are applied to relay 176, voltage from local power source 177 is applied to conductors 178, energizing light source 179, thus illuminating roadside sign 180. In event of failure of the system at any point between program source 32 through transmitter 150 to relay 176, the relay 176 will not be activated, causing armature 176*a* to drop to contact arm 176*b*, disconnecting light source 179 from power source 177, thus darkening the sign 180. Also, in the event of failure, voltage from power source 177 is applied through contact 176*b* to a tone generator 181 which provides a tone signal at a specific frequency such as 30 cycles, which is applied to the signal input of line amplifier 172 for transmission via telephone line 33*a* or other suitable communications circuit to remote control 32*a*.

At control point 32*a* the tone signals from telephone or other communications circuit 33*a* are applied through a line amplifier 182, preferably of automatic level-control type, to the inputs of tone filters 183, 183*a*and 183*b*, each tuned sharply to pass selectively an individual tone having a frequency of 30, 40 and 50 c.p.s. respectively. Thus the 30-cycle tone from tone generator 181, associated with terminal transmitter 150 is passed through filter 183; the 40-cycle tone from roadside point B is passed through filter 183*a*,and the 50-cycle tone from roadside point D is passed through filter 183*b*.The 30-cycle signal from filter 183 is applied to rectifier 184, causing DC voltage to be applied to relay 185. Actuation of arm 185*a* of the relay when voltage is applied to relay 185 causes the arm 185*a* to connect with upper relay contact 185*b* which applies voltage from electric power source 186 to indicating lamp 187, thus visually indicating receipt of a fault signal from Zone 1 if the contacts of relay 176 are connected as shown in FIG. 25. If these relay contacts are connected as shown in FIG. 25A, where a tone signal is transmitted to the control point 32A as long as the roadside equipment is performing properly, then actuation of signal light 187 will indicate that the zone transmitter is operating normally.

In like manner, the tone signal passed by filter 183*a* is converted to direct current by rectifier 184*a*, causing operation of relay 188 and closure of contact arms 188*a* and 188*b*, applying voltage from power source 186 to signal lamp 189. Similarly, the tone passed by filter 183*b* is rectified by rectifier 184*b*, actuating relay 190, causing closure of contact arms 190*a* and 190*b*, thus applying voltage from power source 186 to signal lamp 191. In this manner, presence of a "fault" tone from any of the roadside transmitting points will automatically actuate the signal lamp associated with a specific signaling zone. If the circuit connections at roadside points as shown in FIG. 25A are employed, the signal lamps 187, 189 and 191 at the remote control point 32*a* will be energized at all times when the program signals from source 32 are being relayed by the zone transmitters at the different points along the cable. In event of failure of the program signals to be relayed by a zone transmitter at any point, the check tone associated with the zone transmitter will not be transmitted back to the control point 32*a* and the signal light, such as 187, 189 or 191, will not be energized, indicating lack of program transmission at the roadside point in question. In this case, operation of the checking system is on a "fail-safe" basis in that failure any element in the system will cause the signal light to go out, indicating a fault. While certain tone signal and carrier frequencies have been specified for illustrative purposes, it is understood that other frequencies or modulation means may be utilized to check on operation of the various roadside transmitters at the central control point.

Figures 26, 26A:
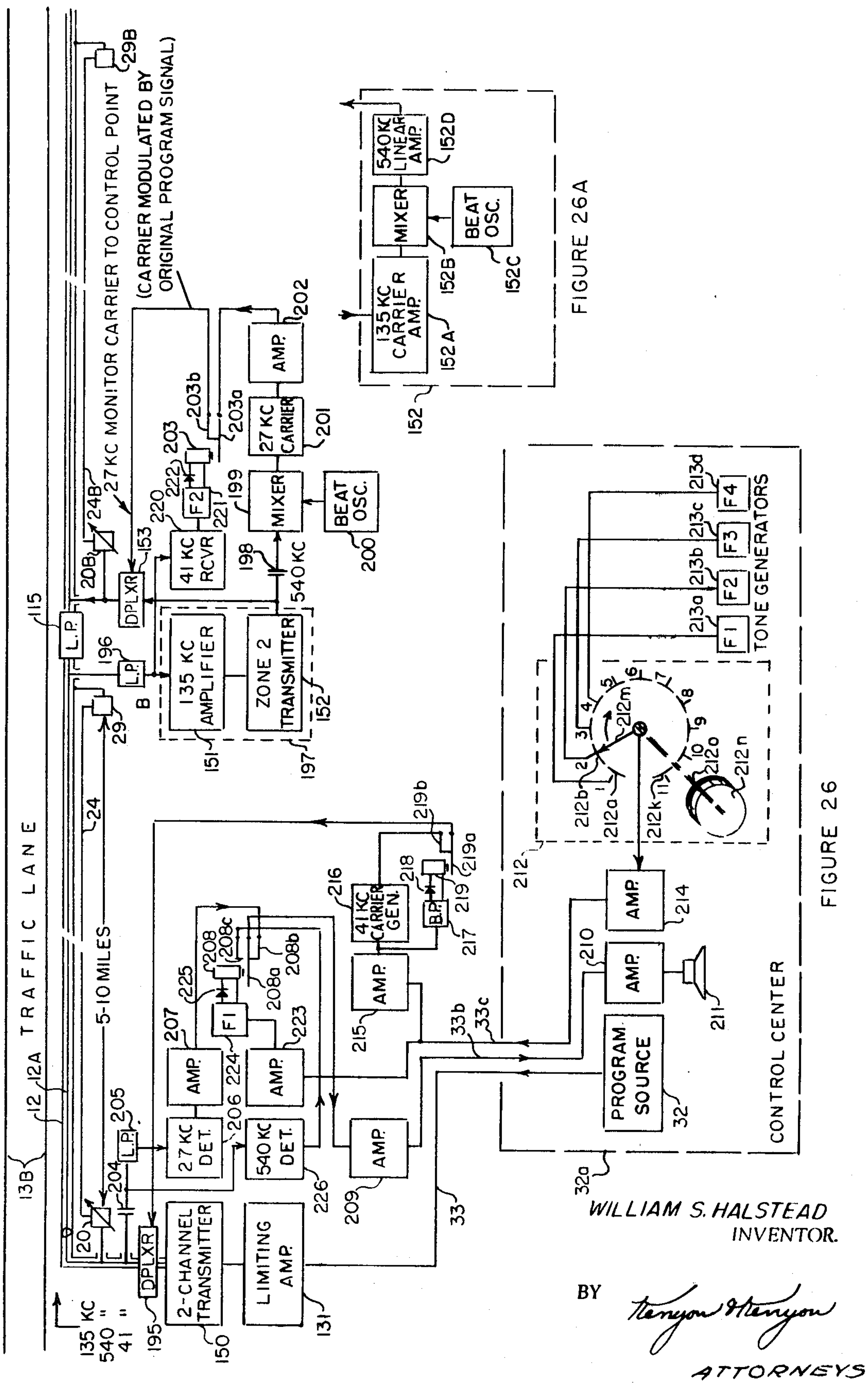
FIG. 26 is a diagrammatic view of an inductive carrier communication system according to the present invention in which means are included for automatically and continuously monitoring the program characteristics of the entire system.
FIG. 26A is a diagrammatic view of a modified form of transmitter that may be used in the system of FIG. 26.

DESCRIPTION OF FIGS. 26 and 26A

Referring now to FIGS. 26 and 26A, there is shown means for automatically and continuously monitoring at the central control point 32*a*,the operative condition, modulation quality and other performance characteristics of the various roadside zone transmitters such as 150, 152 and 166, FIG. 25, and the overall system from program source 32 to the last transmitter at the remote end of coaxial trunk cable 12–12A. As shown in FIG. 26, audio program signals from source 32 are transmitted by telephone line or other suitable communications circuit 33 through limiting amplifier 131 and two-channel transmitter 150 in manner described in connection with FIG. 25. The 135 kc. trunk carrier and 540 kc. roadside broadcast carrier from dual channel transmitter 150 are applied through a line-coupler of any well-known type having multiple signal inputs and a common output such as diplexer 195 to coaxial trunk cable 12–12A. A small amount of signal energy at the 135 kc. and 540 kc. carrier frequencies is applied from trunk cable 12–12A through line-coupler/attenuator unit 20 to inductive signaling conductor 24, the far end of which is connected to coaxide ground sheath 12 through a termination unit such as 29.

At a roadside relay point such as B, at an illustrative distance of 5–10 miles from terminal transmitter 150, the 135 kc. trunk carrier is applied from trunk cable 12–12A through low-pass or band-pass filter 196, thence through a linear amplifier 151 tuned to pass the 135 kc. trunk carrier and modulation sidebands without distortion, to the input of Zone 2 transmitter 152. By frequency conversion method, such as has been described in connection with FIG. 24, (if frequency modulation is employed throughout the system) a new FM carrier at 540 kc. is produced at the output of zone transmitter 152. Alternatively, if an AM carrier is employed the 135 kc. trunk carrier is applied from coaxial trunk cable 12–12A through low-pass or band-pass filter 196 thence through linear amplifier 151 to a transmitter 152 having the arrangement shown in FIG. 26A. As shown in FIG. 26A, the 135 kc. trunk carrier in this case is fed to a 135 kc. amplifier 152A, forming a part of transmitter 152. The amplified 135 kc. carrier is then fed to mixer 152B where it is combined with a 675 kc. carrier from a crystal-controlled or other beat oscillator 152C, producing a difference frequency, in this illustrative example, of 540 kc. modulated by the original program signals. The new 540 kc. modulated carrier then is passed through linear power amplifier 152D whose output is connected through diplex line-coupler 153, FIG. 26, to coaxial trunk cable 12–12A. A small amount of the 540 kc. signal from relay transmitter 152 also is applied through line-coupling/attenuator unit 20B to inductive signaling conductor 24B, the end of which is connected through termination unit 29B to coaxial ground sheath 12 of coaxial trunk cable 12–12A.

While two methods of frequency conversion or translation have been discussed, it is understood that the amplifier or receiver unit 151 and the zone transmitter unit 152 comprise a relay, repeater or translator assembly 197 which may incorporate any of the described carrier relay, repeater or frequency translation means by which signals are relayed along the cable system at roadside points so as to maintain a relatively uniform and strong induction signal at a given carrier frequency, as well as a strong trunk carrier signal, throughout the system.

Sampling and monitoring of the program modulation characteristics of roadside relay or translator equipment 197 and other transmitting and relay equipment associated with the system accomplished from the central control point 32*a* in the following manner: At roadside relay point B, coupling capacitor 198, connected with the carrier output of zone 2, transmitter 152, applies a small amount of modulated RF carrier signal at 540 kc. to mixer 199 where it is combined with a crystal-controlled or AFC carrier from beat oscillator or carrier source 200 operating at an illustrative beat oscillator frequency of 513 kc., to provide a difference signal of 27 kc. The 27 kc. signal is applied to a tuned 27 kc. linear amplifier 201 and associated power amplifier 202 which without distortion amplifies the 27 kc. carrier and its modulation sidebands but which does not pass effectively any signal energy at frequencies outside of the desired band. The output of carrier amplifier 202 is connected as shown through the contacts 203*a* and 203*b* of relay 203, which in the illustration is shown in energized condition as will be explained hereinafter, to a signal input of diplex line-coupler 153, which feeds the program-modulated 27 kc. monitor carrier, derived by heterodyne method from zone transmitter 152, to coaxial trunk cable 12–12A. This 27 kc. monitor carrier passes through low-pass filter 115 to the terminal point where transmitter 150 is located. At this terminal location, the 27 kc. monitor carrier passes through coupling capacitor 204 and low-pass or band-pass filter 205 to the input of a tuned 27 kc. detector or receiver 206.

The recovered audio program signals from detector or receiver 206 are passed through audio amplifier 207 and thence through the closed relay contacts 208*a* and 208*b* of relay 208 which is shown in deenergized condition, to line amplifier 209 whose output is connected to a telephone line or other suitable communications circuit 33*b* connecting with monitor amplifier 210 which drives loudspeaker 211 or other program monitoring equipment (not shown) at the central control point 32*a*. In this manner, when the contacts of relays 203 and 208 are in positions as shown, the overall performance of the system from program source 32 to the program signals as produced at the output circuit of the Zone 2 roadside transmitter 152 along roadway 13B is checked and monitored at the program originating point 32*a*. Inasmuch as there is no demodulation and remodulation of radiofrequency carriers in the roadside monitoring method employed in the monitoring equipment, comprising mixer 199, beat oscillator 200, and RF amplifiers 201 and 202, the sampled monitoring signal accurately reflects the modulation quality of signals from the Zone 2 transmitter 2 as they would be received in car radios served by the transmitter. For example, if there is distortion, noise, loss in signal power, or other deficiency in the signal from roadside transmitter 152, this will be observable quickly at central control point 32*a*.

To enable monitoring of the transmitted signal from each of the zone transmitting units along the roadway so that continuous checks on overall performance of a plurality of zone transmitters throughout the entire roadway system can be made easily and conveniently at the central point 32*a*, automatic switching means 212 is utilized at the control center to automatically and sequentially sample the modulated signal at each transmitter location. This automatic switcher may be of any well-known type, such as the illustrative motor-driven rotary switching means 212 comprising a group of circularly disposed fixed contacts 212*a*, 212*b*, to 212*k*, numbered in this illustrative example from 1 to 11 inclusive, and rotary switch arm 212*m* which is rotated slowly at a desired speed in clockwise direction by motor 212*n* and drive shaft 212*o*. In this illustrative example, the switch arm 212*m* may be rotated at a speed such that it makes electrical connection with contact 2 (212*b*) for a period of 10 seconds during which a specific tone signal at frequency F2, such as 40 cycles, from tone generator 213*b* is applied through switch contact 2, (212*b*) and switch arm 212*m* to the signal input of line amplifier 214. The 40-cycle tone signal (F2) is transmitted from the output of line amplifier 214 via telephone line 33*c* or other suitable communications circuit to line amplifiers 215 and 223 located at the terminal of the roadway system where transmitter 150 is situated. The 40-cycle tone signal as amplified by amplifier 215 is applied to the audio signal input of a carrier generator/modulator 216, in this illustrative example operating on a carrier frequency of 41 kc. This generator/modulator unit can be of any well-known type, employing amplitude modulation, frequency modulation, phase modulation or any other desired mode of modulation, as selected for use in the system.

The 40-cycle tone signal also is applied from line amplifier 215 to a band-pass filter 217, which permits passage of control signals at 40 cycles and above within a selected tone-singnal band. The 40-cycle signal is passed by filter 217 then is rectified by signal rectifier 218 from which DC voltage is applied to relay winding 219, causing the contact arm 219*a* to move against contact 219*b*, as shown in the diagram, thereby applying the 41 kc. carrier from generator 216, modulated by 40 cycles, to one of the RF signal inputs of diplex line-coupler 195 and thence to the coaxial trunk cable 12–12A.

At roadside relay point B this 41 kc. signal passes through low-pass filter 196 and is applied to a 41 kc. receiver 220 which demodulates the carrier. The recovered 40-cycle tone signal then is fed into a tuned filter 221, sharply tuned to be responsive only to the 40-cycle signal (F2). After passing through filter 221 the 40-signal is fed to a rectifier 222, producing a DC voltage which energizes relay 203. Under this condition, contact arm 203*a* makes connection with contact 203*b*, the condition shown in the diagram. As previously described, when these contacts are closed, the 27 kc. monitor carrier from amplifier 202 is applied through diplex line-coupler 153 to the coaxial trunk cable 12–12A. The 27 kc. monitor carrier is transmitted back along trunk cable 12–12A to the terminal point where it is demodulated by detector 206 and the derived audio monitor signals are transmitted by telephone line or other communication circuit to the central control point 32a where by means of amplifier 210 and loudspeaker 211 the 60 received signals are reproduced.

In like manner, the locally transmitted signals from the 540 kc. channel of terminal transmitter 150 may be checked at the control point 32a. For example, when the rotating arm 212m of switching means 212 is in connection with contact 212a (contact No. 1), tone F1, such as 30 cycles, from tone generator 213a is transmitted through line amplifier 214 and communications circuit 33c to the input of line am amplifier 223 at the terminal location which transmitter 150 is associated. The amplified 30-cycle (F1) signal is fed to a tuned filter 224, tuned sharply to F1, (30 cycles) passing only this tone signal to rectifier 225 which applies DC voltage to relay 208. Under this condition, relay contact arm 208a connects with upper relay contact 308c, causing the audio monitoring signals from a local RF detector or receiver unit, 226, tuned to 540 kc., to be applied to the signal input of line amplifier 209 from which the sampled 540 kc. program signals from transmitter 15 are carrier via communications circuit 33b to monitor amplifier 210 and loudspeaker 211 at central point 23a.

As shown in FIG. 26, RF signals from trunk cable 12–12A are applied to the local 540 kc. detector or receiver 226 through connection of the RF input of the receiver 226 with coupling capacitor 204. Detector or receiver 226 is adjusted to be responsive effectively only to strong locally generated carrier signals at 540 kc. from terminal transmitter 150. It is to be noted that in this monitoring process whereby the locally generated 540 kc. carrier from transmitter 150 and its modulation characteristics are checked at the control point 32a, the 30-cycle control tone from the F1 generator 213a is prevented from being transmitted along trunk cable 12–12A because of the frequency selective action of band-pass filter 217 associated with relay 219, which does not permit the passage of the local monitoring tone signal of 30 cycles, thus not causing the actuation of relay 219 and preventing the 41 kc. remote-monitoring control signal from being applied to trunk cable 12–12A. Other control tone frequencies, such as F2, F3, etc. at higher frequency are within the pass band of filter 217 and cause relay 219 to operate, permitting the tone-modulated carrier for the carrier generator 216 to reach coaxial trunk cable 12–12A.

The signals from other roadside relay transmitters (not illustrated) in addition to transmitters 150 and 152 may automatically be sampled and monitored in selective sequence by the method described in the above paragraphs, tone generators 213c and 213d, etc. being employed in a association with switching means 212 to initiate sampling and monitoring of the program signals as transmitted by each roadside relay equipment. For illustrative purposes the control tones such as F1, F2, f3, etc. are shown as originating in individual tone generators 213a, 213b, 213c, etc. However, in practice these signals may be produced by a single generator, such as any well-known oscillator circuit, the frequency of which may be changed to F1, F2, F3, etc. by an additional contact arm and contacts on switching means 212.

While certain control tone and carrier frequencies have mentioned in describing the operation of the system, it is understood that any other suitable control signals at audible or inaudible frequencies or other distinguishing characteristics may be employed, with filter means being designed accordingly to pass or block certain frequencies or frequency bands. Pulsed carriers of different frequencies or pulse rates to provide the equivalent function may also be utilized in lieu of tone-modulated carriers, for example, to accomplish selective sampling of given roadside transmitter equipments. Or dialing pulses may be applied to the trunk cable, utilizing any well-known selector and responder means to effect control of sampling at the roadside points.

Automatic sequential switching means 212 may also be employed in connection with any well-known means to provide visual indication of the zone number of the roadside transmitting equipment that is being sampled at any given moment. For example, an additional contact arm (not shown) on motor-driven shaft 212o and an additional set of contacts (not shown) may be used to actuate a series of numbered pilot lights of the type shown in FIG. 25 to provide visual indication of the particular roadside transmitter that is being monitored at a specific time. Thus when rotary contact arm 212m is in connection with contact 02 (212b), the supplementary contact arm (not shown) driven by motor shaft 212owill be in circuit connection with supplementary contact 02 (not shown) and will actuate a pilot lamp such as 189, FIG. 25 to visually indicate at the central control point that roadside transmitter 152, associated with roadway Zone 2, is being monitored during the 10 second or other predetermined period of time that contact arm 212m is in electrical circuit connection with contact position 02 (shown as 212b in FIG. 26).

Automatic switching means 212 may also be any well-known equivalent device such as a standard electromagnetically actuated rotary step switch of the type commonly employed in telephone dialing circuits. No limitation in this regard is intended by use of the illustrative switching means 212 shown in FIG. 26.

Figures 27, 27A, 27B:
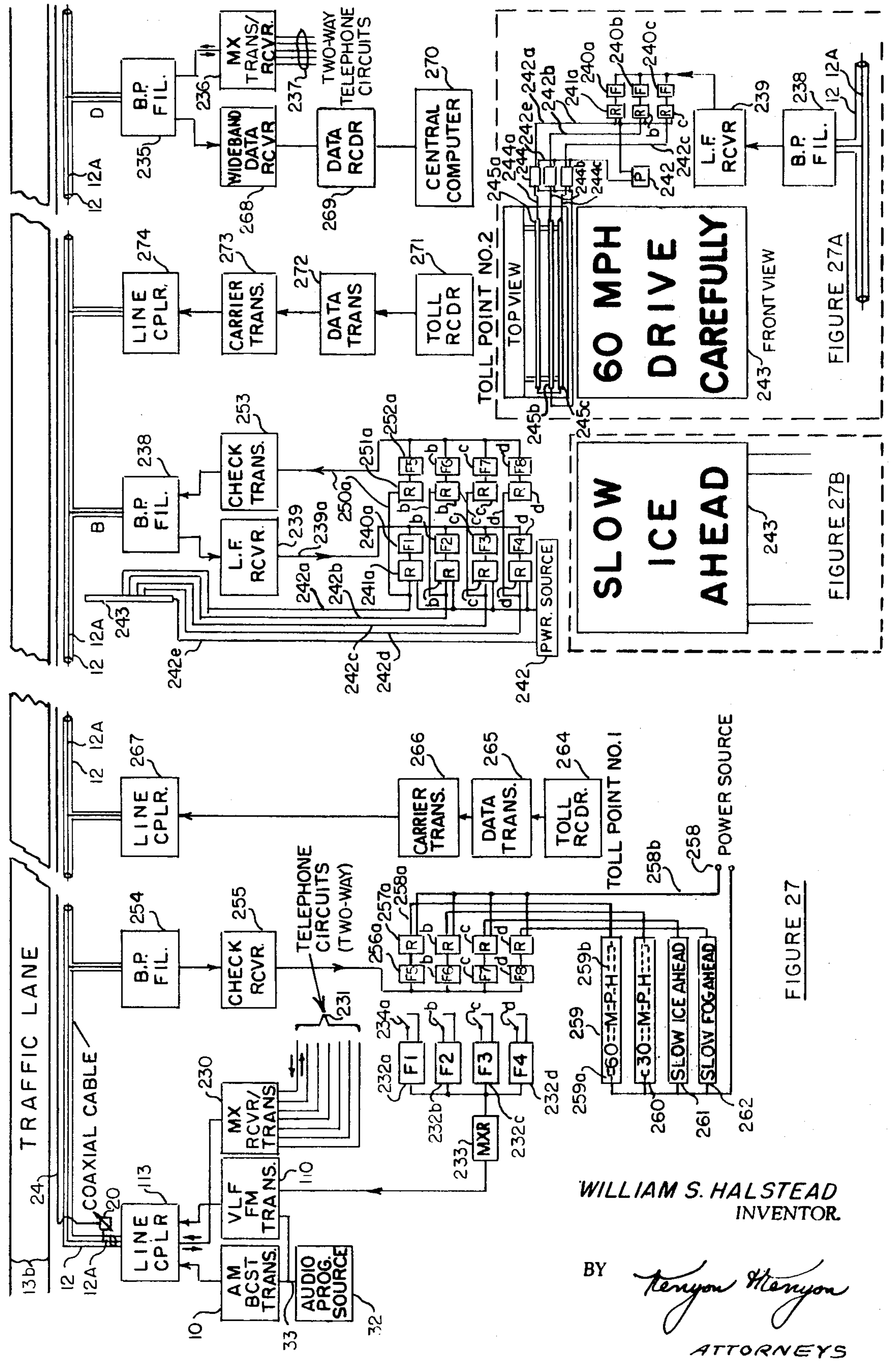
FIG. 27 is a diagrammatic view of another embodiment of the inductive carrier communication system according to the present invention.
FIG. 27A is a diagrammatic view of remote control sign means that may be used in the system of FIG. 27.
FIG. 27B is a diagrammatic view of the sign of FIG. 27A showing change in message as provided by the system of FIG. 27.

DESCRIPTION OF FIGS. 27, 27A and 27B

In many applications, it is desirable that a communications system for use along highways, railroads or other delineated areas be capable of additional remote control, monitoring or checking, signaling and communication functions than those described hereinabove and shown in FIGS. 1–26A. Referring now to FIGS. 27, 27A and 27B, there is shown one inductive carrier communications system according to the present invention which is capable of such additional functions.

Referring to FIG. 27, program signals from a central program source 32 as previously described are applied via telephone line 33 or other communication circuit to the signal inputs of a carrier transmitter 10, operating at a selected carrier frequency such as 540 kc. in the standard AM broadcast band. Transmitter 10, may be of amplitude modulation type as indicated in FIG. 27, employing double sidebands or compatible single-sideband mode of modulation. Or transmitter 10 may alternatively be of any well-known narrow-band frequency modulation, phase modulation or pulse modulation type as may be selected to enable effective reception by radio receivers carried by vehicles or otherwise employed within signaling zones of the system. Program signals from source 32 also are applied to the signal input of low frequency trunk transmitter 110, operating on a selected carrier frequency such as 30 kc. This transmitter may be of narrow-band frequency-modulated type as described hereinabove, whereas RF carrier signals from transmitters 10 and 110 are applied through line-coupler 113 to coaxial trunk cable 12–12A extending along traffic lane 13b. The 540 kc. roadway broadcast carrier is applied through line-coupling/attenuator unit 20, which may be tuned to pass only 540 kc, if desired, or both the 30 kc. and 540 kc. carriers, to induction signaling conductor 24.

Additional carriers at different frequencies also are applied to the RF signal input of line-coupler 113 from a multichannel telephone carrier transmitting and receiving terminal equipment 230 of any well-known type employed in two-way wireline carrier or radio relay systems, utilizing single sideband, frequency or pulse modulation methods as may be desired, in each channel. The multichannel carrier equipment 230 is fed by outgoing audio signals from a number of telephone wireline or other communication circuits 231, conducting incoming and outgoing telephone signals in opposite directions as in standard two-way telephone practice. The carrier signals from source 230 may, for purposes of illustration, occupy the frequency band from 70 kc. to 270 kc., providing a 200 kc. band within which about 24 two-way single-sideband telephone circuits may be accomodated. Any of these telephone channels may be subdivided, by use of a well-known multiplex signaling method into 24 100 word/minute tone teleprinter channels.

In addition to the multiple-channel telephone carrier signals associated with carrier telephone equipment 230, a second group of tone signals, below or above the audiofrequency range occupied by the program signals from source 32, may be applied to a signal input of low frequency FM carrier transmitter 110 from a plurality of tone signal sources such as 232*a*, 232*b*, 232*c* and 232*d* each of given audio frequency F1, F2, F3 and F4 respectively. These tone signals are fed into the signal input of transmitter 110 through mixer or combiner 233 of any well-known type. These tone signals may be used to remotely and selectively control a number of devices along roadway 12*b*, in manner to be described hereinafter, by actuation of switching means such as 234*a*, *b*, *c* and *d*, each associated with tone generators 232*a*, *b*, *c* and *d*, respectively, and electrically connected to cause transmission of a given tone signal, such as F1, when the associated switch, such as 234*a*, is closed.

The 30 kc. trunk carrier and 540 kc. zone carrier signals are employed as has been described hereinabove for program or communication transmission to radio-equipped vehicles or other receiving means within the service area of the system. The telephone carrier signals in the band 70 kc.–270 kc. are transmitted, in this illustrative example, in two directions over trunk coaxial cable 12–12A. to and from any wayside point, such as D, served by trunk cable 12–12A. At wayside point D, the telephone carriers are applied through band-pass filter 235 designed to pass a desired carrier frequency band, to multichannel carrier transmitter/receiver terminal equipment 236 with its associated two-way telephone circuits 237. Although in this illustrative example coaxial trunk cable 12–12A is employed for two-way transmission of carrier telephone circuits, it is probable that in practice two coaxial cables would be employed along the roadway, in which event outgoing carrier signals would employ one cable while the second cable would be utilized for incoming carrier signals as in standard telephone practice. Therefore, no limitation is intended with respect to specific circuit arrangement of carrier telephone equipment in relationship to trunk cables such as 12–12A. For example, one arrangement of the roadway communication system, as shown in FIGS. 17 and 17A, specifically incorporates provision for two separate coaxial cables for multichannel telephone, telegraph, data or television signal transmission, as may be desired.

Referring to the function of tone signaling equipment such as tone generators 232*a*, *b*, *c*, and *d* FIG. 27 these control tones may be received at a given wayside location, such as B, where the tone-modulated low frequency trunk carrier at a frequency such as 30 kc. passes through a band-pass filter 238, which accepts the 30 kc. carrier and will pass other carriers within a given frequency range, rejecting the multichannel telephone carriers and the 540 kc. roadway broadcast signal. The 30 kc. carrier then is demodulated by receiver 239, providing in its audio output circuit 239*a* the tone signals of frequencies F1, F2, F3 and F4. These tones may be utilized at roadside location B for various selective control purposes. In the illustrative example shown in FIG. 27, tone F1 at a frequency such as 30 cycles (or other selected frequency below or above the audio band occupied by the program signals) is passed selectively through a tuned filter 240*a*, designed to pass only F1. The 30-cycle tone signal then is applied to rectifier/relay unit 241*a*, comprising a signal rectifier and relay such as 222 and 203, FIG. 26. Energization of rectifier/relay unit 241*a* causes application of electric power from local power source 242 through conductors 242*a* and 242*e* to a given lighting element (not illustrated in FIG. 27) of roadside sign 243, thereby illuminating and making visible a selected word message, symbol or other roadside signal.

Details of such a remotely controlled sign are shown in FIG. 27A, wherein tone signals F1, F2, F3 and F4 are derived from the demodulated low frequency trunk carrier at the output of receiver 239 whose signal input is connected with the output of band-pass filter 238 having input connection with trunk cable 12–12A as previously described. The 30-cycle tone signal (F1) passes through tuned filter 240*a* to rectifier/relay unit 241*a*. Relay 241*a* applies electric power from source 242 through conductors 242*a* and 242*e* to a step-up transformer 244, whose high-voltage secondary circuit 244*a* causes visible actuation of a neon lighting element 245*a* or other suitable light source. The neon lighting element 245*a*, shown in top view, may be in form of a word or part of a message such as "60MPH," which will only be visible when energized. A second word or part of a message, such as 37 30MPH" may be formed of neon lighting element 245*b*, disposed in front of the neon tube element 245*a* forming the "60MPH" portion of a standard message. Thus when a tone signal of frequency F2, interrelated with "30MPH" is transmitted from the terminal or control point where tone generators F1–F4, inclusive are located, the "30MPH" lighting element 245*b* will be energized as a result of acceptance of the F2 tone signal which in manner previously described is derived from carrier receiver 239 after being transmitted over the trunk cable 12–12A from terminal transmitter 110. The received tone F2 is passed by tuned filter 240*b* to rectifier/relay 241*b*, causing application of power from power source 242 through conductors 242*b* and 242*e* to neon lighting element 245*b*. Inasmuch as it is assumed that the tone signal F1 is not being transmitted at this time, the neon element 245*a* has no applied voltage and therefore is not visible. Other words such as "SLOW ICE AHEAD," shown in FIG. 27B, may when desired by made visible at roadside points by the same selective remote control method, as determined by selective actuation of control switches 234*a–d*, inclusive at the terminal control point. For example, the switch 234*c* and tone F3 from generator 232*c* are in this case associated with the message "SLOW ICE AHEAD." When this F3 tone signal after transmission by the trunk carrier is obtained at the audio output of receiver 239, it is passed through tuned filter 240*c* to signal rectifier/relay unit 241*c* which applies voltage from power source 242 and conductors 242*a* and 242*e* to neon elements 245*c* which form the words "SLOW ICE AHEAD." It is understood that any well-known types of illuminated or remote control signs may be utilized, employing gaseous discharge or incandescent lamps or other means of displaying messages, symbols or signals. It is therefore not intended that the system described herein be limited in any respect to a specific type of wayside sign, symbol or signal.

As it may be desired to provide a checking means to indicate at the control or terminal point whether or not the selected elements of the wayside sign are operating as intended, means are provided for a sensing voltage to be applied to each sign illuminating element, then transmitting a specific checking signal of given frequency as initiated by this sensing operation, along the trunk cable to the control point, where the check signals effect selective operation of monitor display devices corresponding to the information displayed by the wayside sign. Referring to FIG. 27, when electric power is applied to the conductors 242*a* and 242*e* that carry voltage to cause energization of the "60MPH" illuminating section of the sign, sensing voltage from conductor 242*a* is applied through conductor 250*a* to relay 252*a*. Activation of relay 251*a* causes power to be applied to tone generator 252*a*, which produces a tone signal of specific frequency F5, such as 35 cycles. Tone signal F5 is then applied to the signal input of a carrier transmitter 253, operating at an illustrative carrier frequency of 50 kc. The carrier from this transmitter, modulated by the 35-cycle checking tone, is applied through bandpass filter 238 to trunk cable 12–12A and is transmitted back along the cable to the control point where it is passed by bandpass filter 254. After demodulation by receiver 255, which is tuned to the 50 kc. carrier, the 35-cycle tone signal is passed by tuned filter 256*a* and is applied to rectifier/relay 257*a*. the contacts of which apply operating voltage from power source 258 through conductors 250*a* and 250*b* Lto energize visual display device 259 which may take the form of a translucent panel 259*a* behind which is an incandescent lamp 259*b*. Thus when this display device at the control point is selectively actuated in response to the checking signal from the wayside point, a replica of the information displayed by the sign at the wayside point is shown in illuminated form, in this case indicating a 60 m.p.h. speed limit.

Although one illustrative means of sensing the operative condition of the wayside sign or signal is shown in FIG. 27, it is understood that other remote sensing and transmission methods may be employed. For example, the illumination provided by a given sign element, such as neon tubing 245*a*, FIG. 27A, may be sensed by any well-known photocell (not shown) disposed in front of the neon tubing which in response to light from the sign element will actuate a relay (not shown) providing the equivalent control function of relay 251*a* of causing the transmission of check tone, F5, back along trunk cable 12–12A to the central control point.

The selective actuation of the other monitor display devices, 260, 261 and 262 is accomplished in similar manner by transmission of the check tones F6, F7, and F8 as determined by the operation of relays 251*b*, *c* and *d* at the remote point in response to sensing voltage as produced by each sign element when in operative condition. These tone signals are utilized at the control point after demodulation by receiver 255 via filters 256*b*, *c* and *d* and associated rectifier/relay units 257*b*, *c* and *d* to selectively actuate display devices 260, 261 and 262. Other wayside signs may be monitored in similar manner by use of different carrier frequencies or by means of automatic, sequential sampling of each wayside sign by the method described in connection with FIG. 26, wherein only a single carrier frequency is utilized for checkback sampling purposes. It is pointed out that all of these checking methods are base on the "fail-safe" principle common to railroad practice wherein failure of any portion of the signaling system is indicated since the presence of the tone signals is required to effect signal display at all points; lack of this tone signal would then be definite indication of failure at some point of the overall system. Referring to FIG. 27, means for transmitting data signals to a central computer, also are provided as shown, at a point along a toll highway, such as toll collection point No. 1A toll payment registering or recording device 264 such as employed at tollbooths actuates an associated data keying or transmission unit 265 which translates the information provided by recording device 264 into an electrical signal in the form of pulses or tone signals which may be applied to a carrier transmitter 266 to effect modulation of the emitted carrier. The carrier transmitter 266 is operated on a selected frequency, such as 450 kc., that will not interfere with other carriers employed by the system. This carrier is applied through line-coupling unit 267 to coaxial trunk cable 12–12A. At a point D along the cable where a central computer machine 270 is used to process data received from a number of toll booths along the highway, for example, the 450 kc. carrier modulated by data signals from tool collection point No. 1 is applied through band-pass filter 235, which passes all carriers employed in the multichannel telephone system and in data transmission, to data receiver 268. Receiver 268 is preferably of side-band or multichannel type to enable simultaneous reception of a number of data carriers from various toll collection points. The output of receiver 268 is connected with a data recorder 269 of any well-known type, such as a magnetic tape data storage device or a group of such storage devices commonly employed for this purpose. The data signals, as recorded, then can be fed when and as desired to the central computer 270.

In similar manner, data derived from toll recorder or register 271 at toll collection point No. 2 is applied to data translator 272, the output of which is fed to the signal input circuit of carrier transmitter 273, whose output is applied through line coupling unit 274 to coaxial trunk cable 12–12A. The carrier from transmitter 273, modulated by the data signals, may be on a noninterfering frequency such as 500 kc. This carrier is received at computer location D, passing through band-pass filter 235, and is demodulated by wideband or multichannel receiver 268 whose common output supplies the recovered data signals to data recorder means 269 in manner previously described.

Among the functions of this system would be the rapid analyzing and totalizing of the amount of tolls received during any given time period from the various toll collection points; the number of vehicles entering and leaving roadway entrance and exit points during any given period or at any time and other information of value in operation of highway systems. While the illustrative example is related to highways it is evident that the same signaling and data handling methods could be applied to railroads for analyzing and otherwise gathering traffic data relating to car movements, locations, destinations, routings, speeds, etc. at a central point where a computer may be employed to coordinate various railway operations to assist management in expediting traffic operations.

Figures 28, 29, 29A:
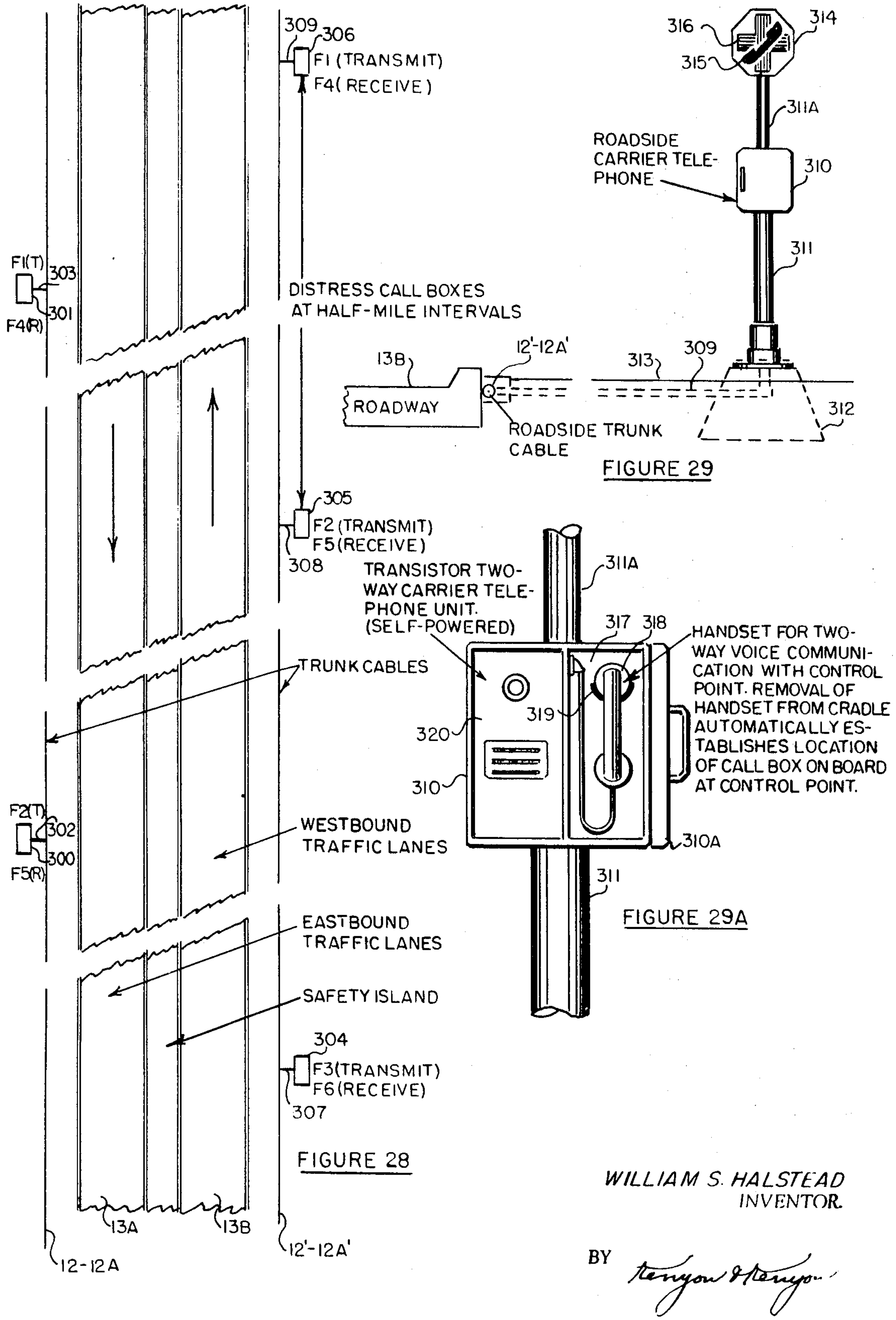
FIG. 28 is a diagrammatic view of a roadside carrier system for distress signaling and communication purposes, utilizing the coaxial trunk cable shown in previous illustrations.
FIG. 29 is a diagrammatic view of a roadside carrier telephone which may be used in the present invention.
FIG. 29A is a detailed view of the telephone of FIG. 29.

DESCRIPTION OF FIGS. 28, 29 and 29A

FIGS. 28 through 29A illustrate a system to provide two-way communication between drivers of disabled cars and other highway users to quickly obtain assistance when required. Referring to FIG. 28, traffic lanes 13 A and 13 B, carrying traffic moving in opposite directions as indicated, are served by coaxial trunk cable 12–12A and 12′–12A′ respectively, each cable extending along the roadside and each serving, in this case, only the traffic lane that is within the shortest distance from the cable. At intervals along the cable 12–12A such as distances of ½ miles, distress call boxes 300 and 301 are coupled to the trunk cable 12–12A through branch connections 302 and 303, respectively. In like manner, a number of other callboxes, not illustrated, may be coupled to the trunk cable 12–12A for use in establishing communications with a central control point serving a given section of highway, as will be described in detail in subsequent paragraphs. In the same manner, also, callboxes 304, 305 and 306 are coupled to trunk cable 12′–12′ via branch connections 307, 308 and 309, respectively. The coupling means may be any suitable and well-known types such as those shown in preceding figures or other coupling means commonly employed in the communications art to enable two-way carrier telephone equipment to be interconnected with a remote terminal station via carrier signals impressed at different frequencies on a coaxial cable.

As indicated in FIG. 28, the carrier telephone equipment of callbox 306 utilizes a carrier frequency designated as F2 for voice transmission from the location of the roadside equipment to a central control point, (not shown in FIG. 28) later to be described in connection with succeeding figures. Box 306 also utilizes carrier frequency F4 in receiving voice-modulated carrier signals from the central control point, not shown in FIG. 28, but illustrated in following figures. Roadside callbox employs a carrier frequency designated as F2 for voice transmissions to the central point and F5 for reception of voice-modulated carrier signals from the central point. Callbox 304 utilizes carrier frequency F3 for outgoing signals to the control point and F6 for signals from the control center. Thus, by use of different carrier frequencies, such as those in the band between 70 and 400 kc. or at any other suitable part of the carrier telephone spectrum, for transmit and receive functions at each roadside callbox, full flexibility of operation is provided, avoiding loss of time in placing emergency calls that would be involved if the same carrier frequency, or "party line," arrangement were to be employed at all callboxes.

In similar manner, roadside callboxes 300 and 301, associated with trunk cable 12–12A, utilize different frequencies at each location for transmitting and receiving functions. However, the same pair of carrier frequencies F1 and F4, may, if desired, be employed at callbox 301 as are employed at callbox 306 since the carrier signals are impressed on different cables, as shown. The callboxes associated with trunk cable 12–12A are staggered in location with respect to those associated with cable 12–12A since such an arrangement, in an emergency, provides roadside communication facilities within one-fourth of a mile of each other.

An illustrative physical arrangement of the roadside carrier telephone equipment is shown in FIG. 29 in which the carrier telephone equipment is housed in a weatherproof case 310, disposed at a convenient height for the user on a metal stanchion 311 which is mounted on a concrete base 312, imbedded in the ground 313. An extension element 311A of stanchion 311 supports a sign 314 on which a symbol 315 representing a conventional telephone handset is presented to indicate availability of a voice communication facility without reliance on words in a particular language for this purpose, thereby assisting international tourists who might otherwise have difficulty in understanding the function of the callboxes. The cross symbol 316 is shown as an internationally recognized mark relating to emergency or medical services. The roadside carrier telephone equipment within case 310 is connected with roadway trunk cable 12′–12′A by means of a coaxial cable branch connection 309.

An illustrative arrangement of the carrier telephone equipment contained in case 310 is shown in FIG. 29A in which the access door 310A is shown in open position. The right-hand compartment 317 provides a standard telephone handset 318, normally held in position as shown on cradle 319 which, when the handset is removed by a user will move upward, causing automatic initiation of communication capability of the associated carrier telephone equipment and will cause automatic and instantaneous visual identification of the exact location of the calling box at the control center with which all roadside boxes in a given area are interconnected via the coaxial cable, as will be described in detail in subsequent paragraphs. The left-hand compartment 320 incorporates carrier telephone transmitting and receiving equipment of transistor type, powered by a suitable storage battery such as enclosed cadmium battery, maintained in charged condition by solar cells, as described in subsequent figures and paragraphs, thereby providing a local self-contained source of electric power on highways not served by power lines.

DESCRIPTION OF FIGS. 30 AND 30A

The system of the invention may also be adapted for use with multiplex methods in providing emergency call and communications services of two-way voice type via the roadside cable as previously described. Existing wayside telephone services as employed on some highways normally employ wire telephone methods. However, such wire-connected methods often are not feasible on turnpikes or interstate highways which traverse areas that are not in the vicinity of telephone circuits or electric power mains. This is the situation on many turnpikes now in operation, where the highways cross open country and often are many miles from telephone or electric power facilities.

Figures 30, 30A, 31:
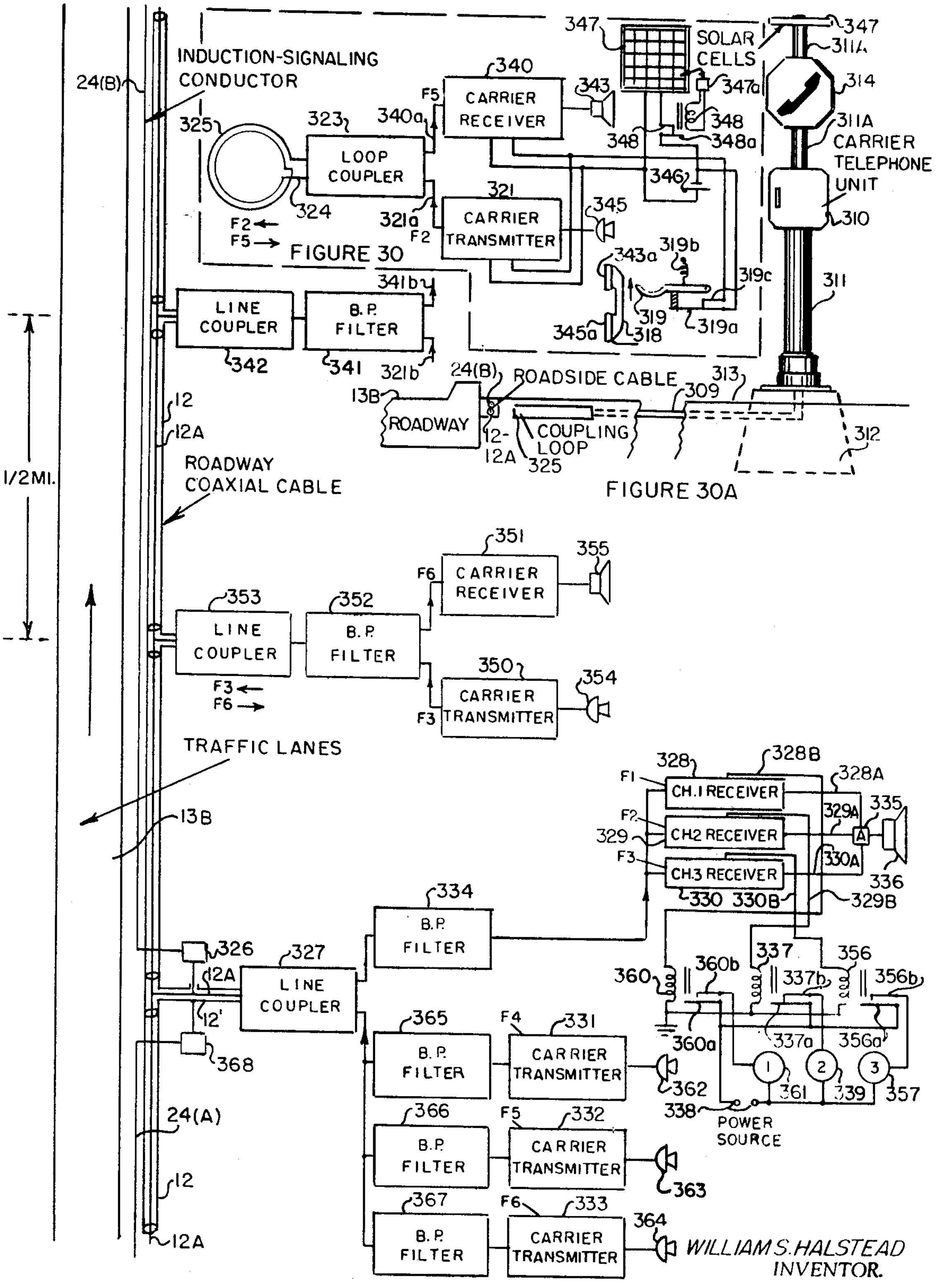
FIG. 30 is a diagrammatic view of another embodiment of the present invention.
FIG. 30A is a diagrammatic view of a telephone equipment which may be used in the present invention.
FIG. 31 is a diagrammatic view of another embodiment of the present invention.

Such an adaptation of the system of the invention is shown in FIGS. 30 to 31 inclusive in which roadside carrier telephones are shown coupled to the roadside cable 12–12A described in foregoing paragraphs. In FIG. 30, emergency calls of motorists in event of breakdown or accident may be made from a roadside carrier frequency in a band below 400 kc. Carrier receiver 340 and loop coupler unit 323 are utilized in transmission or reception of voice-modulated or tone-modulated carrier signals on a carrier frequency such as 200 kc. or other suitable frequency. The carrier wave energy is impressed during transmission on a loop antenna or inductor 324, inductively coupled to roadside cable inductive-signaling element or conductor 24B, electrically connected with coaxial cable 12–12A as previously described.

A motorist in need of assistance, for example, will employ the roadside microphone 345 from which voice signals modulating the illustrative 200 kc. carrier F2, will be transmitted via transmitter 321, loop coupler 323 and loop 324 to the roadside cable, comprised of inductive element 24B, and coaxial conductors 12–12A. The voice or tone modulated carrier signal then travel via the cable to the nearest control point where a receiver 329 tuned to F2 is located. Similarly, return voice signals modulating a carrier F5, from the control center transmitter 332 to the motorist at the carrier receiver, 340, will be picked up by loop 324 via inductive coupling with coaxial cable 12–12A and associated inductive signaling element 24B, by receiver 340, tuned to F5. The audio signals for receiver 340 will be reproduced by loudspeaker 343 or earphone 343, thereby giving definite acknowledgment of receipt by the central control point of distress messages from the motorist at the roadside location where receiver 340 and transmitter 321 are installed.

It is pointed out that, unlike conventional roadside telephone systems, the system of the invention requires no physical wire connection with the roadside cable, therefore the inductive carrier telephone equipment such as transmitter 321 and receiver 340, loop coupler 323 and loop 324 may be added to highway communication system at any location at any future date without the problems involved in directly connected wire telephone circuits. Moreover, it is emphasized that the transmitter 321, receiver 340, and loop 324 may, if desired, be in the form of miniaturized transistor equipment that may be carried by vehicles, thereby enabling two-way voice communication by motorists with central control points in event of breakdown or emergency without need to leave the vehicle and walk some distance to fixed wayside points.

In the illustrative embodiment of the invention as related to roadside installations of the carrier wave transmitter 321 and receiver 340, it is assumed that a battery 346, of nickle-cadmium type or other suitable form, will be utilized to power the transmitter 321 and receiver 340. In this event, the battery 346 can be maintained in charged condition at all times by means of a bank of solar cells 347, which convert sunlight into electrical power sufficient to maintain charge of battery 346 without need for other source of electrical energy. In this event, one or more cells of the solar energy source 347 may be connected to as indicated by arrows to provide energy to actuate a relay **347*a*, 348 and 348*a* whose contacts 348 and 348*a* when closed apply charging current to battery 346 as long as sunlight is effective in developing energy from solar cell 347. At night, or when the solar cell does not develop sufficient energy to maintain charging power for battery 346, the relay contacts 348 and 348*a* open, thus disconnecting the battery 346 from solar cells 347**.

The microphone 345, FIG. 30, may be a part of a handset 318 of conventional type, and the speaker 343 may be in the form of earphone **343*a* of the handset 318. Handset 318 may be disposed normally on hangup bracket or cradle 319. When the handset is removed the bracket or cradle 319 is moved upward by spring 319*b* so that contact arm 319*a* closes circuit with contact 319*c*, thereby applying voltage to operate transmitter 321 and receiver 340 only when the handset is removed from bracket 319, as when required to converse over the system. At other times, transmitter 321 and receiver 340** are in "off" condition, drawing no current.

An illustrative physical embodiment of the arrangement as described above is shown in FIG. 30A, wherein the carrier transmitter 321 and receiver 340 are housed in a weatherproof case 310, supported at a convenient height by stanchion 311 disposed along the roadside on a cement base 312. Motorists are informed of the presence of the roadside communications facility by a distinctive sign 314 which is supported on the upper extension 311A of pedestal 311. The bank of solar cells 347 may be mounted at the top of the stanchion 311A as shown to give them maximum exposure to sunlight and protection against vandalism. At the lower part of the stanchion 311 a coaxial cable 309, of any suitable well-known type, is employed to carry FR energy from the transmitter 321, within case 310, to coupling loop 325 and thence by inductive coupling, to the inductive signaling element 24B associated with coaxial cable 12–12A, disposed adjacent to roadway 13B. In similar manner, loop 325 can pick up carrier signals from inductive signaling element 24B and via cable 309 transfer this signal to the carrier receiver 340, disposed in roadside case 310, thereby effecting two-way voice communication with the control point.

DESCRIPTION OF FIG. 31

In the arrangement shown in FIG. 31, the carrier output of roadside transmitter 321 may be connected at point **321*a* to the input 321*b* of a band-pass filter 341 or other suitable device whose output is connected to line coupler 342, having an output physically connected with coaxial cable 12–12A. In similar manner the carrier input of 340 a receiver 340 may be connected to output circuit 341*b* of band-pass filter 341 whose input is connected to line coupler 342 having an input connected with coaxial cable 12–12A**.

A second roadside unit having a carrier signal at frequency F3 passes from transmitter 350 via band-pass filter unit 352 to cable 12–12A through coupler 353, while a second carrier signal from the central control point at frequency F6 passes in opposite direction through the coupler 353 and band-pass filter unit 352 to receiver 351 from coaxial cable 12–12A.

At the control point, incoming carrier signals, as on frequency F3 from roadside transmitter 350 flow through a first coupling unit 326, connected with inductive signaling element 24A, to the inner conductor 12A coaxial cable 12–12A. The incoming signals then pass through line coupler 327 and band-pass filter 334 to a group of receiver units, such as 328, 329 and 330, each tuned to a specific frequency of a roadside transmitter, such as 350, FIG. 31 and 321. Rectified carrier wave energy at an appropriate output 330B of receiver 330 is applied to the winding of relay 356. The contacts **356*a* and 356*b* of this relay close when rectified carrier energy is applied to winding 356 enabling voltage from power source 338 to be applied to a signal light or other indicator 357. The latter designates the location of the roadside carrier telephone transmitter that is calling the central station. At the same time, voice signals from roadside transmitter 350 on carrier frequency F3 will be amplified by audio amplifier 335, connected to the audio output 330A of carrier receiver 330, and reproduced by loudspeaker 336**.

In similar manner, other carrier signals from roadside transmitters at different locations may be selected, amplified and demodulated by receivers 328 and 329, or any number of receivers within limitations of the system with respect to channel allocation. Thus, for example, a received carrier signal at the control point as picked up by the receiver 329 from roadside carrier transmitter 321 will be rectified and applied to relay 337 whose contacts **337*a* and 337*b* will close, actuating indicator 339. Voice signals from transmitter 321 will be reproduced by loudspeaker 336, via connection with amplifier 335 whose input is bridged across the audio output of receiver 329**.

Likewise, signals received from a third roadside transmitter, not illustrated, on carrier frequency F1 will be picked up by receiver 328, applying through connection 328B rectified carrier voltage to actuate relay 360 whose contacts **360*a* and 360*b* when closed energize visual indicator 361, providing exact information with respect to the location of the roadside transmitter from which the signal is received, in this illustrative example. Voice signals from the roadside transmitter are reproduced by loudspeaker 336 connected to bridging amplifier 335 having an input connected with the audio output of receiver 328**.

Talk-back from the control point where the receivers as above described are located is accomplished as follows: In acknowledging a call from roadside carrier 350, FIG. 31, an operator at the control point where receiver 330 is located, employs carrier transmitter 333 operating on a carrier frequency F6, emitting carrier wave energy modulated by audiofrequency signals from microphone 364. Voice-modulated carrier F6 flows through band-pass filter 367, line-coupler unit 367, and is impressed on coaxial cable 12–12A. At the roadside location from which the call-for-assistance originated via carrier transmitter 350, the signal from carrier transmitter 333 passes through line-coupler 353 and band-pass filter 352 to carrier receiver 351, responsive to carrier wave energy at frequency F6. The audio signals derived from carrier receiver 351 are reproduced by loudspeaker or earphone 355, thus enabling two-way voice communication between the roadside point and the control center.

Similarly, in response to carrier phone signals from carrier transmitter 321, FIG. 30, operating at a carrier frequency F2 as picked up by the receiver unit 329 at the control point, an operator employing a microphone 363 and carrier transmitter 332, operable on carrier frequency F5, can establish two-way communication with the roadside point. In this case, the voice-modulated carrier at frequency F5 flows through band-pass filter 366 to line coupler 327, impressing the signal on the coaxial cable 12–12A. At the roadside point, where carrier transmitter 321 is located, the carrier signal from transmitter 332 is picked up by inductive coupling method by loop 325, passed through coupling unit 323, to carrier receiver 340 tuned to the carrier frequency F5. The audio signals from the receiver are reproduced by loudspeaker 343 or earphone 343A, thus establishing two-way voice communication between the roadside point and the control center.

In like manner, in response to signals picked up by receiver 328 from a third roadside transmitter, not shown, an operator at the control point may utilize carrier transmitter 331, operating on carrier frequency F4 modulated by voice signals from microphone 362, to converse with a third roadside unit. In this case, outgoing signals from carrier transmitter 331 flow through band-pass filter 365 and line-coupler 367 to coaxial cable 12–12A, extending between the control center and roadside points, as heretofore described.

It is pointed out that although band-pass filters, such as 341, 352, 334, 365 and 367, inclusive, are shown in the drawings, these may not be required in the event that precautions are taken in the design of the carrier transmitters and receivers to provide restruction of bandwidth within system perameters such that interference between channels is minimized.

Either narrow-band frequency modulation, or various forms of amplitude modulation of single-sideband or double-sideband type may be utilized. While the foregoing specification is descriptive of certain illustrative embodiments of the system of the invention, incorporating in a single integrated system a number of roadway communication functions, the scope of the invention is not in any sense restricted to the illustrative embodiments as shown, and other embodiments evident to those skilled in the art are considered to be within the scope of the present invention, said scope to be determined from the following claims.

What is claimed is:

1. An inductive carrier communication system comprising a coaxial trunk cable, a carrier wave generator having an output circuit coupled to said coaxial cable, means for modulating carrier wave energy from said generator, a plurality of inductive-signaling transmission lines each of predetermined characteristic impedance and extending parallel to said trunk cable in sequential manner, coupling means disposed at intervals along said trunk cable connecting each of said inductive-signaling transmission lines to said trunk cable, said coupling means including means for regulating the amount of carrier wave energy applied to each of said inductive-signaling transmission lines, and termination means connecting the ends of each of said transmission lines whereby each of said transmission lines is terminated in its characteristic impedance to minimize undesired wave reflection and radiation of electromagnetic waves in space.

2. A communication system of inductive-signaling type for use along transportation routes such as roadways, railroads, waterways and the like comprising a carrier wave generator, means for modulating carrier wave energy from said generator, means coupling the output of said generator to a coaxial cable having a center conductor and a conducting sheath held at ground potential, said coaxial cable extending parallel to a transportation route served by the system, a plurality of inductive-signaling conductors extending sequentially along said route parallel to said coaxial cable, each of said inductive-signaling conductors having a coupling means connecting each of said inductive-signaling conductors to said center conductor whereby a controlled amount of carrier wave energy may be transferred from said center conductor to each of said inductive-signaling conductors, and terminating means connecting the end of each of said inductive-signaling conductors to said conducting sheath of said coaxial cable to minimize standing waves on said inductive-signaling conductors and effect relative uniformity of the external induction field extending about said last-mentioned conductors along the total length of route served by the system.

3. A transportation route communications system of inductive-signaling type comprising a carrier wave generator, means for modulating carrier wave energy from said generator, means coupling the output of said generator to a coaxial cable having a center conductor and extending parallel to a transportation route served by the system, dielectric means about said center conductor, a conducting sheath formed about said dielectric means and held at ground potential, an inductive-signaling conductor extending parallel to said coaxial cable for the length of a communication zone along said transportation route, coupling means intermediate said center conductor and said inductive-signaling conductor whereby a desired amount of carrier wave energy may be transferred from said center conductor to said inductive-signaling conductor, and terminating means at the end of said inductive signaling conductor, said terminating means connecting the end of said inductive-signaling conductor to said conducting sheat at ground potential.